US011686890B2

(12) United States Patent
Miller et al.

(10) Patent No.: US 11,686,890 B2
(45) Date of Patent: Jun. 27, 2023

(54) MULTI-LEVEL DIFFRACTIVE OPTICAL ELEMENT THIN FILM COATING

(71) Applicant: Lumentum Operations LLC, San Jose, CA (US)

(72) Inventors: John Michael Miller, Ottawa (CA); Gonzalo Wills, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 286 days.

(21) Appl. No.: 16/948,732

(22) Filed: Sep. 30, 2020

(65) Prior Publication Data

US 2021/0026051 A1   Jan. 28, 2021

Related U.S. Application Data

(63) Continuation of application No. 16/044,081, filed on Jul. 24, 2018, now Pat. No. 10,802,185.
(Continued)

(51) Int. Cl.
*G02B 5/18* (2006.01)
*G02B 1/115* (2015.01)
(Continued)

(52) U.S. Cl.
CPC ............ *G02B 5/1871* (2013.01); *G02B 1/115* (2013.01); *G02B 5/1857* (2013.01); *G02B 27/44* (2013.01);
(Continued)

(58) Field of Classification Search
CPC .... G02B 5/1871; G02B 1/115; G02B 5/1857; G02B 27/44; G02B 27/1093; G02B 27/4272; G02B 2005/1804
(Continued)

(56) References Cited

U.S. PATENT DOCUMENTS 4,895,790 A   1/1990 Swanson et al.
5,218,471 A   6/1993 Swanson et al.
(Continued)

FOREIGN PATENT DOCUMENTS

CN   1576891 A   2/2005
CN   101140400 A   3/2008
(Continued)

OTHER PUBLICATIONS

Arbabi A., et al., "Subwavelength-Thick Lenses with High Numerical Apertures and Large Efficiency Based on High Contrast Transmitarray," Oct. 30, 10 pages.
(Continued)

*Primary Examiner* — Collin X Beatty
(74) *Attorney, Agent, or Firm* — Harrity & Harrity, LLP

(57) ABSTRACT

A transmissive optical element may include a substrate. The transmissive optical element may include a first anti-reflectance structure for a particular wavelength range formed on the substrate. The transmissive optical element may include a second anti-reflectance structure for the particular wavelength range formed on the first anti-reflectance structure. The transmissive optical element may include a third anti-reflectance structure for the particular wavelength range formed on the second anti-reflectance structure. The transmissive optical element may include at least one layer disposed between the first anti-reflectance structure and the second anti-reflectance structure or between the second anti-reflectance structure and the third anti-reflectance structure.

20 Claims, 18 Drawing Sheets

Related U.S. Application Data

(60) Provisional application No. 62/546,172, filed on Aug. 16, 2017.

(51) Int. Cl.
*G02B 27/44* (2006.01)
*G02B 27/42* (2006.01)
*G02B 27/10* (2006.01)

(52) U.S. Cl.
CPC ...... *G02B 27/1093* (2013.01); *G02B 27/4272* (2013.01); *G02B 2005/1804* (2013.01)

(58) Field of Classification Search
USPC ......................................................... 359/566
See application file for complete search history.

(56) References Cited

U.S. PATENT DOCUMENTS

| | | | |
|---|---|---|---|
| 5,245,468 A | 9/1993 | Demiryont et al. | |
| 5,446,587 A | 8/1995 | Kang et al. | |
| 5,774,239 A | 6/1998 | Feldman et al. | |
| 6,562,253 B1 * | 5/2003 | Ogusu | G02B 5/1857 430/30 |
| 6,905,618 B2 | 6/2005 | Matthews et al. | |
| 7,142,363 B2 | 11/2006 | Sato et al. | |
| 7,914,691 B2 * | 3/2011 | Kim | B41N 1/12 427/256 |
| 8,163,144 B2 | 4/2012 | Tilsch et al. | |
| 9,239,467 B2 | 1/2016 | Shpunt et al. | |
| 9,354,369 B2 | 5/2016 | Hendrix et al. | |
| 9,529,127 B2 * | 12/2016 | Heitzmann | G03F 7/0035 |
| 10,094,961 B2 | 10/2018 | Speckbacher et al. | |
| 10,712,475 B2 | 7/2020 | Miller et al. | |
| 10,802,185 B2 | 10/2020 | Miller et al. | |
| 2002/0042024 A1 * | 4/2002 | Tanaka | G03F 7/0005 430/326 |
| 2003/0016447 A1 | 1/2003 | Kato et al. | |
| 2004/0020892 A1 * | 2/2004 | Matthews | G02B 5/1857 216/2 |
| 2004/0263981 A1 | 12/2004 | Coleman et al. | |
| 2007/0103782 A1 | 5/2007 | Lee et al. | |
| 2008/0074748 A1 | 3/2008 | Kittaka et al. | |
| 2011/0159691 A1 | 6/2011 | Shih et al. | |
| 2012/0037872 A1 | 2/2012 | Ikarashi et al. | |
| 2017/0186794 A1 | 6/2017 | Ockenfuss | |
| 2017/0235153 A1 | 8/2017 | Lee-Bouhours et al. | |
| 2019/0041243 A1 | 2/2019 | Funk et al. | |
| 2020/0400861 A1 | 12/2020 | Miller et al. | |

FOREIGN PATENT DOCUMENTS

| | | |
|---|---|---|
| CN | 103424995 A | 12/2013 |
| CN | 106654858 A | 5/2017 |
| DE | 10328873 A1 | 1/2004 |
| DE | 102005020944 A1 | 12/2005 |
| EP | 1309051 A1 | 5/2003 |
| EP | 3150970 A1 | 4/2017 |
| EP | 3438618 A1 | 2/2019 |
| JP | H0643311 A | 2/1994 |
| JP | H11174217 A | 7/1999 |
| JP | 2001066424 A | 3/2001 |
| JP | 2004062200 A | 2/2004 |
| JP | 2007234094 A | 9/2007 |
| JP | 2008102488 A | 5/2008 |
| JP | 2010262320 A | 11/2010 |
| JP | 2011187139 A | 9/2011 |
| JP | 2017126742 A | 7/2017 |
| JP | 2019028083 A | 2/2019 |
| KR | 20150031336 A | 3/2015 |
| TW | 200745620 A | 12/2007 |
| TW | 201123266 A | 7/2011 |
| WO | 2005038501 A1 | 4/2005 |
| WO | 2007131375 A1 | 11/2007 |
| WO | 2014014930 A2 | 1/2014 |

OTHER PUBLICATIONS azt.tm's Blog Findings and Projects., "Kinect Pattern Uncovered," Mar. 4, 2011, 8 pages, Retrieved from the Internet: [URL:https://azttm.wordpress.com/2011/04/03/kinect-pattern-uncovered/].

Extended European Search Report for Application No. EP18188407.3, dated Jan. 2, 2019, 11 pages.

Extended European Search Report for Application No. EP18188469.3, dated Jan. 2, 2019, 11 pages.

Jahns J., et al., "Two-Dimensional Array of Diffractive Microlenses Fabricated by Thin Film Deposition," Applied Optics, Mar. 1990, vol. 29 (7), pp. 931-936.

Krackhardt U., et al., "Design of Dammann-Gratings for Array Generation," Optics Communications, Dec. 1989, vol. 74 (1-2), pp. 31-36.

Macleod H.A., "Thin-Film Optical Filters," http://kashanu.ac.ir/Files/thin%20film%20optical%20filter(macklod).pdf, 2001, 667 pages.

Mait J.N., "Fourier Array Generators," 1997, 16 pages.

Optics & Photonics News, "Subwavelength Photonics," May 2017, 8 pages.

Opton., "Diffractive Optics for Laser and LED Applications," Sep. 15, 2010, 1 page, Retrieved from the Internet: [URL:http://www.edphoton.com/English.htm].

Turunen J., et al., "Diffractive Optics for Industrial and Commercial Applications," 1997, 3 pages.

Vasara A., et al., "Binary Surface-Relief Gratings for Array Illumination in Digital Optics," Applied Optics, Jun. 1992, vol. 31 (17), pp. 3320-3336.

Wendt J.R., et al., "Nanofabrication of Subwavelength, Binary, High Efficiency Diffractive Optical Elements in GaAs," Aug. 1, 1995, 4 pages.

\* cited by examiner

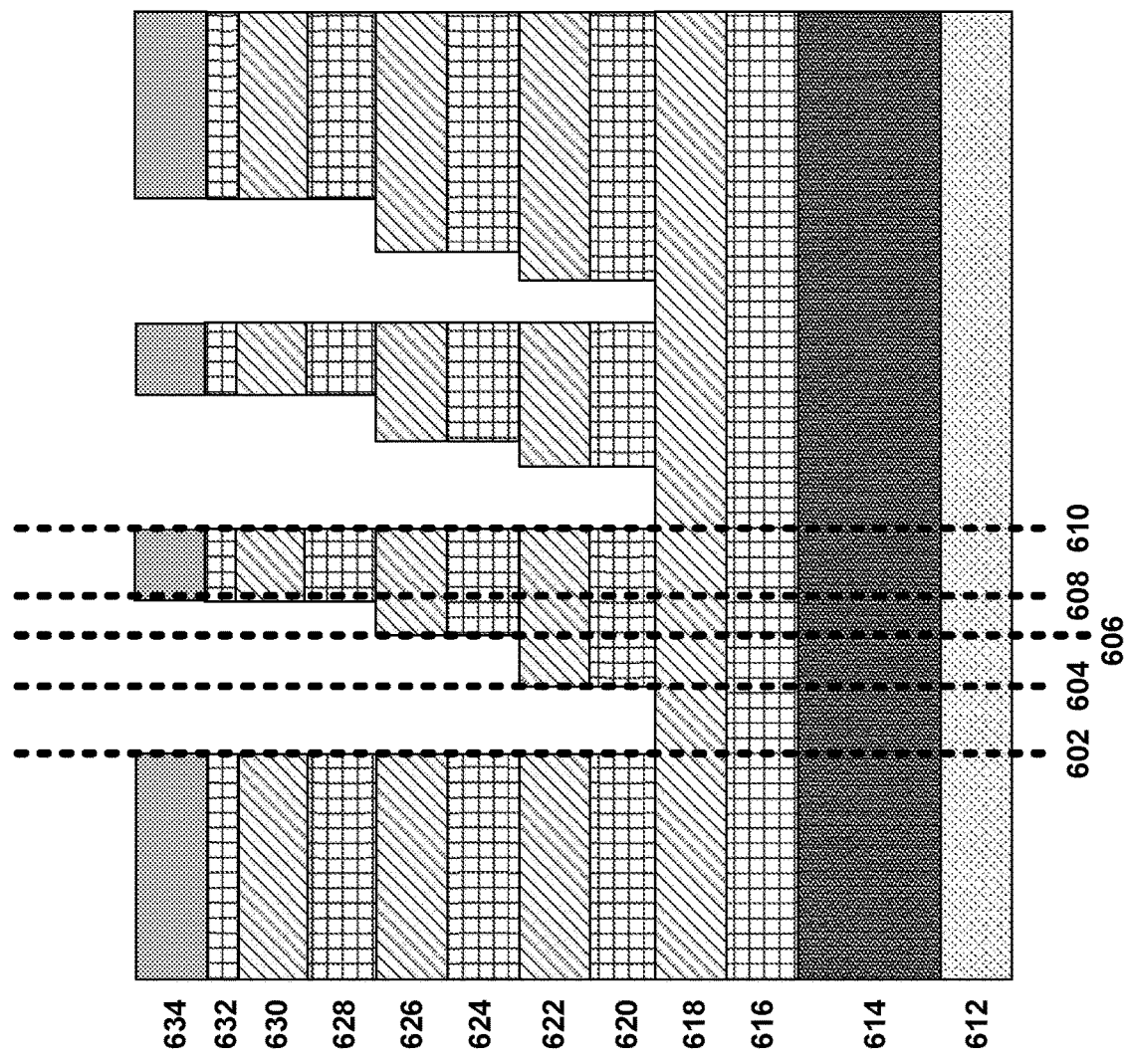

MULTI-LEVEL DIFFRACTIVE OPTICAL ELEMENT THIN FILM COATING

RELATED APPLICATION(S)

This application is a continuation of U.S. patent application Ser. No. 16/044,081, filed Jul. 24, 2018 (now U.S. Pat. No. 10,802,185), which claims priority under 35 U.S.C. § 119 to U.S. Provisional Patent Application No. 62/546,172, filed on Aug. 16, 2017, the contents of which are incorporated by reference herein in their entireties.

TECHNICAL FIELD

The present disclosure relates to thin film structures. More particularly, some aspects of the present disclosure relate to a multi-level thin film structure for a diffractive optical element (DOE) that provides a particular phase delay between an etched region and an un-etched region of the multi-layer thin film structure, and that provides anti-reflectance for a particular wavelength range.

BACKGROUND

A diffractive optical element (DOE) may be used for directing a beam. For example, a DOE, such as a diffractive lens, a spot array illuminator, a spot array generator, a Fourier array generator, and/or the like, may be used to split a beam, shape a beam, focus a beam, and/or the like. A DOE may be integrated into a multicast switch, a wavelength selective switch, a gesture recognition system, a motion sensing system, a depth sensing system, and/or the like.

A two-level surface relief profile (sometimes termed a "binary surface relief profile") may be selected for a surface relief DOE. For example, the two-level surface relief profile may be selected to approximate a continuous surface relief profile and to enable use of a photolithographic procedure and/or an etching procedure to manufacture the DOE. A two-level thin film stack may be used to create a single order binary DOE, such as a diffractive lens, and may be associated with a diffraction efficiency of approximately 40% for a single order binary DOE. The two-level thin film stack may be used for a spot array generator, and may provide a symmetrical spot array. For example, utilizing a two-level thin film stack may provide an axis of symmetry such that intensity of spots is associated with a 180 degree axis of symmetry. Some materials used for DOEs may require a relief depth of greater than a threshold, thereby resulting in a threshold etch time to manufacture the DOE.

SUMMARY

According to some possible implementations, a transmissive optical element may include a substrate. The transmissive optical element may include a first anti-reflectance structure for a particular wavelength range formed on the substrate. The transmissive optical element may include a second anti-reflectance structure for the particular wavelength range formed on the first anti-reflectance structure. The transmissive optical element may include a third anti-reflectance structure for the particular wavelength range formed on the second anti-reflectance structure. The transmissive optical element may include at least one layer disposed between the first anti-reflectance structure and the second anti-reflectance structure or between the second anti-reflectance structure and the third anti-reflectance structure. A first relief depth between a first surface of the first anti-reflectance structure and a second surface of the second anti-reflectance structure and a second relief depth between the first surface and a third surface of the third anti-reflectance structure may be configured to form a diffractive optical element associated with a first phase delay and a second phase delay, respectively, for the particular wavelength range.

According to some possible implementations, an optical element may include a substrate. The optical element may include a first anti-reflectance structure for a particular wavelength range formed on the substrate. The optical element may include a second anti-reflectance structure for the particular wavelength range formed on the first anti-reflectance structure. The optical element may include at least one other anti-reflectance structure for the particular wavelength range formed on the second anti-reflectance structure. A relief depth between a first surface of the first anti-reflectance structure and a second surface of the at least one other anti-reflectance structure may be configured to form a diffractive optical element associated with a particular phase delay for the particular wavelength range.

According to some possible implementations, a method may include depositing a plurality of layers onto a wafer, wherein the depositing forms three or more anti-reflectance structures for a particular wavelength range, wherein a first anti-reflectance structure, of the three or more anti-reflectance structures, is formed on the wafer and beneath a second anti-reflectance structure of the three or more anti-reflectance structures, and wherein the second anti-reflectance structure is formed beneath a third anti-reflectance structure of the three or more anti-reflectance structures. The method may include etching a subset of layers of the plurality of layers to form a three or more-level relief profile, wherein the etching forms a diffractive optical element associated with a particular phase delay for the particular wavelength range between the first anti-reflectance structure and another of the three or more anti-reflectance structures.

BRIEF DESCRIPTION OF THE DRAWINGS

FIGS. 6A-6G are diagrams of an example implementation relating to the example process shown in FIG. 4.

DETAILED DESCRIPTION

The following detailed description of example implementations refers to the accompanying drawings. The same reference numbers in different drawings may identify the same or similar elements.

A diffractive optical element (DOE) may be manufactured using a photolithographic procedure and/or an etching procedure. For example, to approximate a continuous surface relief profile, a two-level surface relief profile may be selected for the DOE, and a surface of the DOE may be etched or patterned to form the two-level surface relief profile. The two-level surface relief profile may be used to create a phase delay for a beam passing through the DOE.

For a single order binary DOE, such as a diffractive lens, a diffractive efficiency of approximately 40% may be achieved using the two-level surface relief profile. However, this diffractive efficiency may be less than a threshold for utilization of a DOE in an optical system, such as an optical communications system, a gesture recognition system, a motion detection system, a depth sensing system, and/or the like. Moreover, a spot array pattern or diffraction pattern created by the DOE may be symmetrical, and an asymmetric diffraction pattern may be desired for a particular optical system.

Some implementations, described herein, may provide a multi-level DOE with a threshold diffractive efficiency. For example, some implementations, described herein, may provide a multi-level DOE (e.g., greater than two levels) to provide a particular phase delay at a particular wavelength of incident light between portions of the DOE and an anti-reflectance at the particular wavelength of incident light. Moreover, some implementations, described herein, may provide a DOE associated with an asymmetric spot array pattern or diffraction pattern.

In some implementations, described herein, a DOE may be associated with a relief depth to fabricate a selected surface relief profile of less than a threshold, thereby resulting in a reduced aspect ratio, a reduced etch time, and/or a reduced fabrication cost for the DOE (relative to other techniques for manufacturing a DOE). Furthermore, layers of the DOE may provide an integrated etch stop for the DOE. Some implementations, described herein, may provide a method for manufacturing a DOE. For example, a DOE may be manufactured using a thin film deposition procedure, an etching procedure, and/or the like, which may provide improved layer thickness accuracy and improved manufacturability relative to other techniques for manufacturing a DOE.

Figure 1:
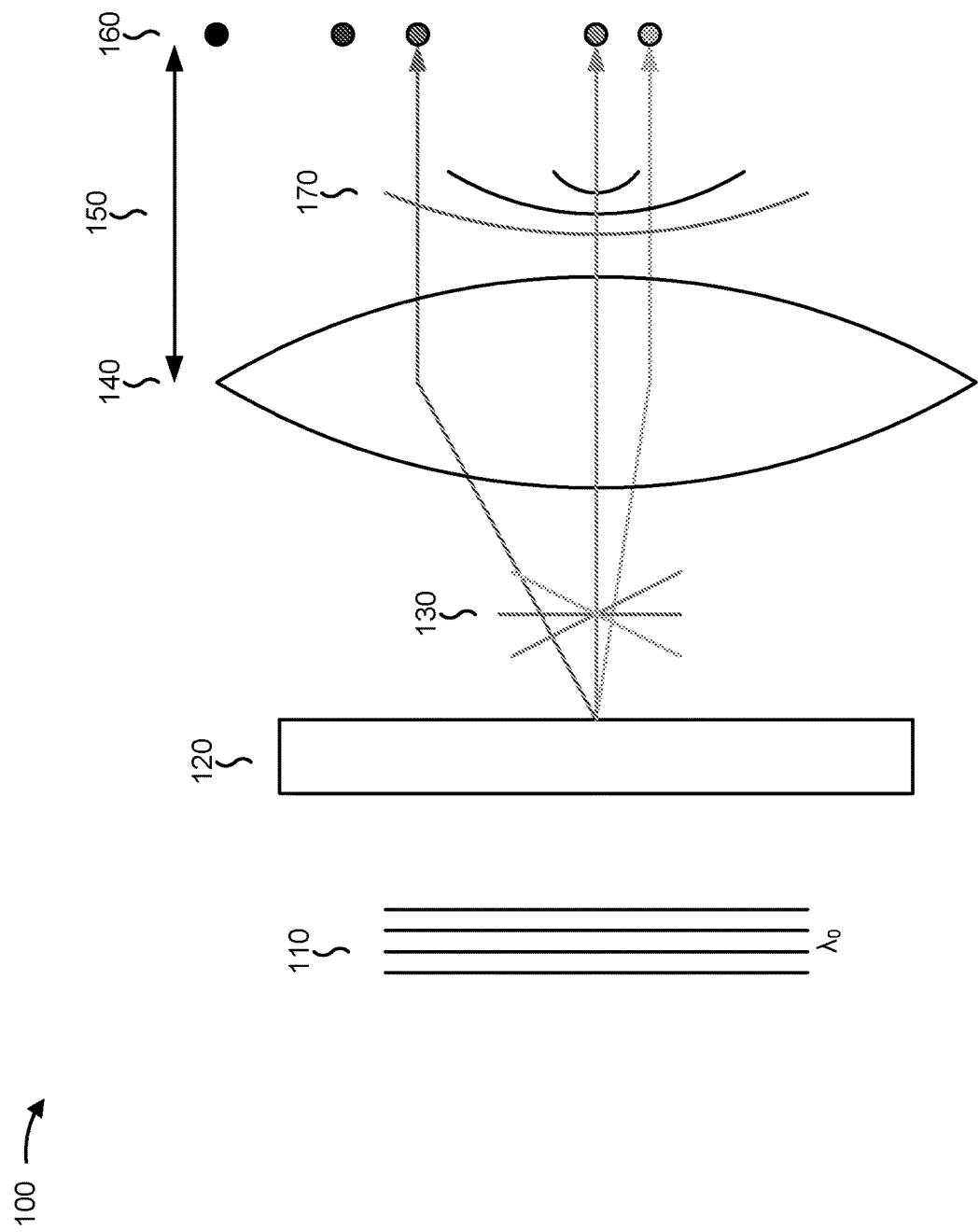
FIG. 1 is a diagram of an overview of an example implementation described herein.

FIG. 1 is a diagram of an overview of an example implementation 100 described herein. FIG. 1 shows an example of spot array generation using a surface relief DOE grating and a converging lens as a spot array illuminator (sometimes termed a spot array generator or dot array generator).

As shown in FIG. 1, an incident plane wave 110, with a wavelength of $\lambda_0$, is directed toward a surface relief DOE grating 120. In some implementations, surface relief DOE grating 120 may be a DOE with a multi-level surface relief profile, such as a four-level DOE, an eight-level DOE, a $2^n$-level DOE (where n>1), a k-level DOE (e.g., where k>2), and/or the like. In some implementations, surface relief DOE grating 120 may include, for example, alternating layers of silicon (Si) and silicon dioxide ($SiO_2$), alternating layers of hydrogenated silicon (Si:H) and silicon dioxide, and/or the like.

In some implementations, layers of surface relief DOE grating 120 may be configured to provide an anti-reflectance functionality at a particular wavelength of incident light. In some implementations, a layer of surface relief DOE grating 120 (e.g., a silicon dioxide layer) may provide an etch stop functionality during manufacture of surface relief DOE grating 120. In some implementations, incident plane wave 110 may have a wavelength in a range from approximately 800 nanometers (nm) to approximately 1100 nm, approximately 800 nm to approximately 1000 nm, approximately 830 nm to approximately 1000 nm, approximately 850 nm to approximately 1000 nm, approximately 915 nm to approximately 1000 nm, approximately 940 nm to approximately 1000 nm, approximately 930 nm to approximately 950 nm, and/or the like. In some implementations, incident plane wave 110 may have a wavelength in a range from approximately 1100 nm to approximately 2000 nm, approximately 1400 nm to approximately 1700 nm, approximately 1520 nm to approximately 1630 nm, approximately 1540 nm to approximately 1560 nm, and/or the like. Additional details regarding surface relief DOE grating 120 are described herein.

As further shown in FIG. 1, surface relief DOE grating 120 diffracts incident plane wave 110, and directs wavefront 130 (e.g., diffracted orders of incident plane wave 110) toward a converging lens 140. Converging lens 140 is separated by a focal distance 150 from a focal plane 160. In some implementations, example implementation 100 may be used for a gesture recognition system, and focal plane 160 may be a target for gesture recognition. Additionally, or alternatively, focal plane 160 may be an object (e.g., for an object sensing system), a communications target (e.g., for an optical communications system), and/or the like.

As further shown in FIG. 1, based on converging lens 140 altering an orientation of wavefront 130 to form wavefront 170, wavefront 170 is directed toward focal plane 160 causing a multiple spot array pattern to be formed at focal plane 160. In some implementations, the multiple spot array pattern may be asymmetric. In some implementations, surface relief DOE grating 120 may be used to create a two-dimensional spot array. In this way, surface relief DOE grating 120 may be used as a spot array illuminator to create a spot array at focal plane 160 from incident plane wave 110, thereby enabling a gesture recognition system, a motion sensing system, an optical communications system, and/or the like.

As indicated above, FIG. 1 is provided merely as an example. Other examples are possible and may differ from what was described with regard to FIG. 1.

Figure 2A:
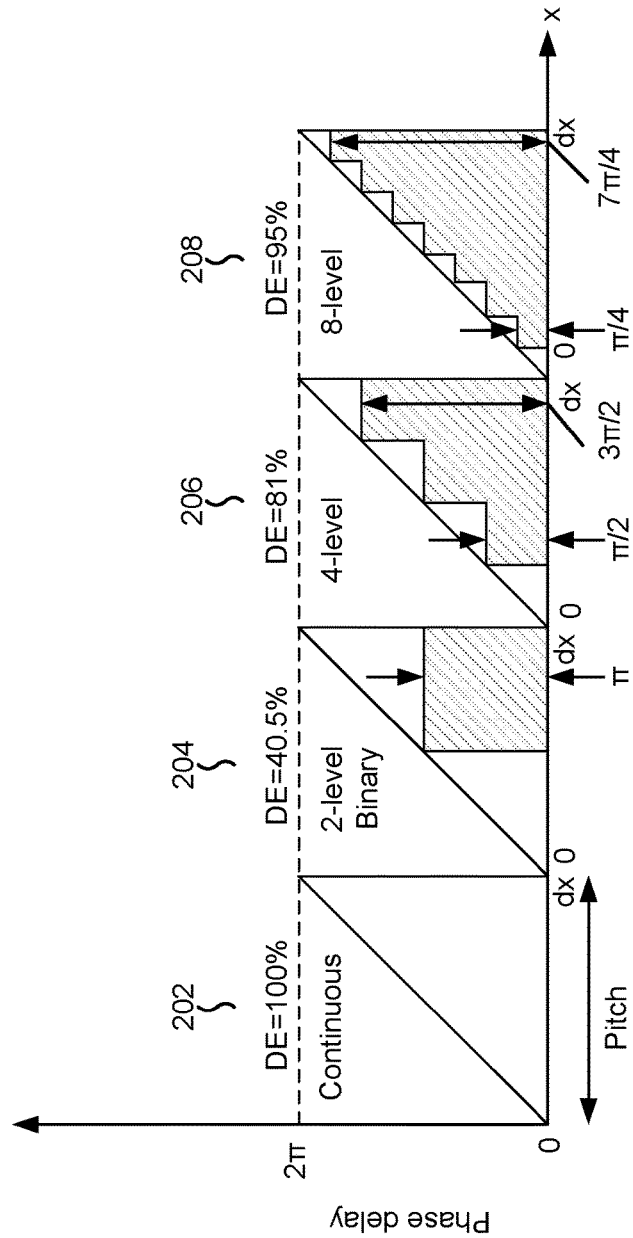
FIGS. 2A and 2B are diagrams of an example implementation described herein.
Figure 2B:
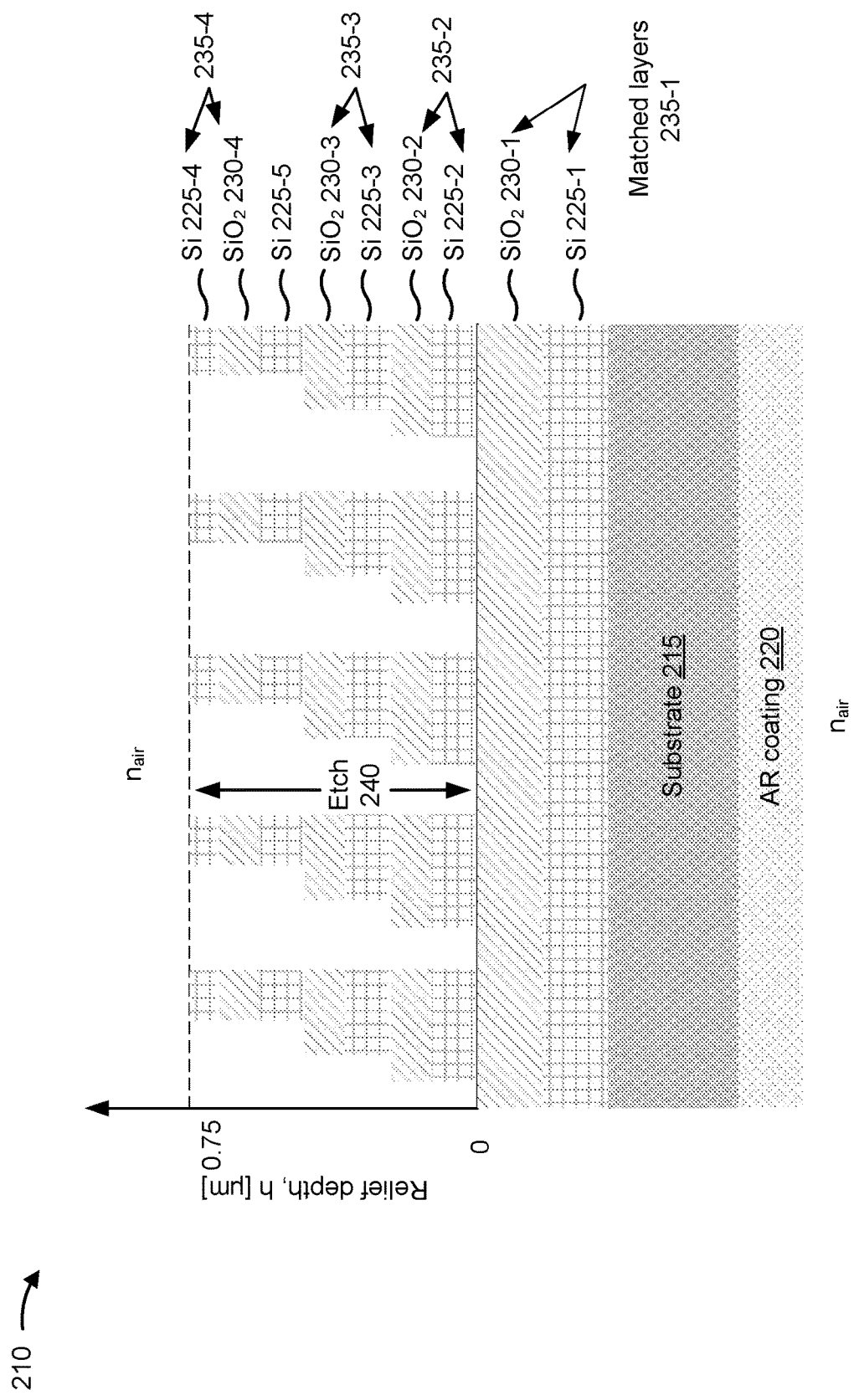

FIGS. 2A and 2B are diagrams relating to an example implementation described herein. As shown in FIG. 2A, and by diagram 200, a continuous relief profile can be quantized into a set of discrete levels to enable a photolithographic and/or an etching procedure to be used for manufacturing a DOE.

As further shown in FIG. 2A, and by reference number 202, a continuous relief profile may be associated with a diffractive efficiency of approximately 100% (for a single order configuration) and may provide a continuously increasing phase delay of a from a second pitch position, dx, relative to a first pitch position, 0. As shown by reference number 204, the continuous relief profile may be approximated by a two-level relief profile (sometimes termed a binary relief profile). The two-level relief profile may be associated with a diffractive efficiency of approximately 40.5% (for a single order configuration) and may provide a π phase delay at a second region of a DOE, from pitch position 0.5 dx to pitch position dx, relative to a first region of the DOE, from pitch position 0 to pitch position 0.5 dx.

As further shown in FIG. 2A, and by reference number 206, the continuous relief profile may be approximated by a 4-level relief profile. The 4-level relief profile may be associated with a diffractive efficiency of approximately 81% (for a single order configuration), and may provide a π/2 phase delay at a second region of the DOE, from pitch position 0.25 dx to pitch position 0.5 dx, relative to a first region of the DOE, from 0 to 0.25 dx; a π phase delay at a third region of the DOE, from 0.5 dx to 0.75 dx, relative to the first region of the DOE; and a 3π/2 phase delay at a fourth region of the DOE, from 0.75 dx to dx, relative to the first region of the DOE.

As further shown in FIG. 2A, and by reference number 208, the continuous relief profile may be approximated by an 8-level relief profile. The 8-level relief profile may be associated with a diffractive efficiency of approximately 95% (for a single order configuration), and may provide phase delays in increments of π/4 at regions of the DOE (e.g., π/4 at a second region from 0.125 dx to 0.25 dx; π/2 at a third region, from 0.25 dx to 0.375 dx; 3π/4 at a fourth region, from 0.375 dx to 0.5 dx; etc. relative to a first region of the DOE, from 0 to 0.125 dx). In some implementations, another configuration with another diffraction efficiency may be used. For example, a configuration using 2 orders, 4 orders, 10 orders, 100 orders, and/or the like may be used to increase a diffraction efficiency relative to the single order configuration. In this case, such as for +/−100 orders, a diffraction efficiency of approximately 75% to 80% may be achieved for a two-level relief profile. Based on using a multi-level DOE with greater than 2 levels, diffractive efficiency may be improved to greater than a threshold (for a single order configuration and/or the like), such as greater than 41%, greater than 50%, greater than 75%, greater than 80%, greater than 85%, greater than 90%, greater than 95%, greater than 99%, and/or the like.

Although some implementations, described herein, are described in terms of a 2n level DOE (where n>1) (e.g., a 4-level DOE, an 8-level DOE, etc.), other types of k-level DOEs are possible (where k>2), such as a 3-level DOE, a 5-level DOE, a 6-level DOE, etc. Additionally, or alternatively, although some implementations, described herein, are described in terms of a regular distribution of levels (e.g., for a 4-level DOE, phase delays of kπ/2 for k=[0, 3]), other non-regular distributions of levels are possible (e.g., for a 4-level DOE, phase delays of 0, π/5, π/3, 3π/4, and 7π/8). Additionally or alternatively, although some implementations described herein are described in terms of DOEs having regions with a regular distribution of the pitch (e.g. for a 4-level DOE, the pitch (1 dx) is split equally with each region spanning 0.25 dx), other non-regular distributions of pitch are possible (e.g. for a 4-level DOE, a first phase delay region may span 0.1 dx, while second, third and fourth phase delay regions may span 0.2 dx, 0.4 dx and 0.3 dx respectively). In this way, a multi-level DOE may enable additional quantities of phase delays and/or values of phase delays.

As shown in FIG. 2B, a DOE 210 may include a substrate 215. In some implementations, substrate 215 may be a glass substrate, a fused silica substrate, and/or the like. For example, substrate 215 may be a fused silica substrate with a thickness of approximately 200 micrometers, and with a refractive index, $n_{sub}$, of 1.45. For example, as shown in FIG. 2B, a set of alternating silicon and silicon dioxide layers may be disposed onto a top surface of substrate 215 and patterned to form a relief profile, as described herein, and anti-reflectance coating 220 may cover the bottom surface of substrate 215. In some implementations, anti-reflectance coating 220 may be absent or may be substituted with another anti-reflectance structure such as the anti-reflectance structure formed on the top surface. In some implementations, an anti-reflectance structure may include a thin film, a thin film structure, an anti-reflectance coating, a deposited thin layer, a deposited thin film layer, and/or the like.

As further shown in FIG. 2B, the set of alternating silicon and silicon dioxide layers may include a set of silicon layers 225 and a set of silicon dioxide layers 230. For example, silicon layer 225-1 may be disposed on substrate 215, and silicon dioxide layer 230-1 may be disposed on silicon layer 225-1. Silicon layer 225-1 and silicon dioxide layer 230-1 may form a pair of matched layers 235-1, which provide a first anti-reflectance structure. Similarly, silicon dioxide layer 230-2 may be disposed on silicon layer 225-2, and may form a pair of matched layers 235-2, which provide a second anti-reflectance structure; silicon dioxide layer 230-3 may be disposed on silicon layer 225-3, and may form a pair of matched layers 235-3, which provide a third anti-reflectance structure; silicon layer 225-4 may be disposed on silicon dioxide layer 230-4, and may form a pair of matched layers 235-4, which provide a fourth anti-reflectance structure. As shown, silicon layer 225-5 may be disposed between matched layers 235-3 and matched layers 235-4. Silicon layer 225-5 may be configured to provide a particular functionality for DOE 210, and may be configured independent of the anti-reflectance structures, thereby improving flexibility in DOE design.

In some implementations, DOE 210 may be exposed to an air or gaseous interface. For example, a first surface of DOE 210 (e.g., surfaces of matched layers 235) and a second surface of DOE 210 (e.g., a surface of anti-reflectance coating 220) may be exposed to an air interface with a refractive index, $n_{air}$, of 1.0. A relief depth, h, may be calculated based on the equation:

$$h = \frac{(K-1)\lambda_0}{K(n_{tf} - n_{air})}$$

where $\lambda_0$ is a nominal illuminating wavelength for a DOE, such as DOE 210 and K represents a quantity of levels. To reduce a relief depth, a material with a relatively large refractive index may be selected, such as silicon dioxide, which may result, in some implementations, in a relief depth, h, of an etch (e.g., etch 240) of approximately 0.75 micrometers (μm). In some implementations, the relief depth may be a relief depth of between 0.4 μm and 3.0 μm, between 0.5 μm and 2.5 μm, between 1.0 μm and 2.0 μm, and/or the like. In some implementations, layers may be index matched to increase transmittance of DOE 210. For example, silicon layers 225 and silicon dioxide layers 230 may be selected based on respective refractive indices of 3.5 and 1.45 being within a threshold amount of between 1.4 and 3.9.

In some implementations, other materials may be selected for a thin film coating material, such as tantalum pentoxide ($Ta_2O_5$) and silicon nitride ($Si_3N_4$), which may have a refractive index of approximately 2.0. Based on using silicon thin film for layers of DOE 210, a relief depth for a 4-level relief profile is reduced relative to other material selections. For example, for a 3π/2 phase delay in a 4-level relief profile at a nominal illuminating wavelength of 1550 nm, silicon dioxide may be associated with a relief depth of approximately 2.33 μm, tantalum pentoxide and silicon nitride may be associated with a relief depth of approximately 1.16 μm, and silicon may be associated with a relief depth of approximately 0.47 μm. Other materials with similar refractive indices, such as a refractive index range of between 1.5 and 3.5, a refractive index of 2.0, and/or the like may be used. Similarly, for an 8-level relief profile, silicon dioxide may be associated with a relief depth of approximately 2.71 μm, tantalum pentoxide and silicon nitride may be associated with a relief depth of approximately 1.36 μm, and silicon may be associated with a relief depth of approximately 0.54 μm. In some implementations, hydrogenation may be used to improve optical performance of a coating material. For example, hydrogenated silicon may be used for silicon layers 225. In this way, hydrogenation may be used to reduce an absorption edge of silicon to enable use for a wavelength of between 800 nm and 1000 nm and to reduce the desired relief depth of the DOE to improve manufacturing (e.g. increase quality and/or yield). In some implementations, Argon may be used in a deposition chamber to form a low absorption coating (e.g., less than a threshold amount of absorption). In some implementations, a silicon carbide may be used with a refractive index of approximately 2.7 for use with visible light wavelengths and/or the like, such as for a DOE lens for a camera.

As indicated above, FIGS. 2A and 2B are provided merely as examples. Other examples are possible and may differ from what was described with regard to FIGS. 2A and 2B.

Figure 3A:
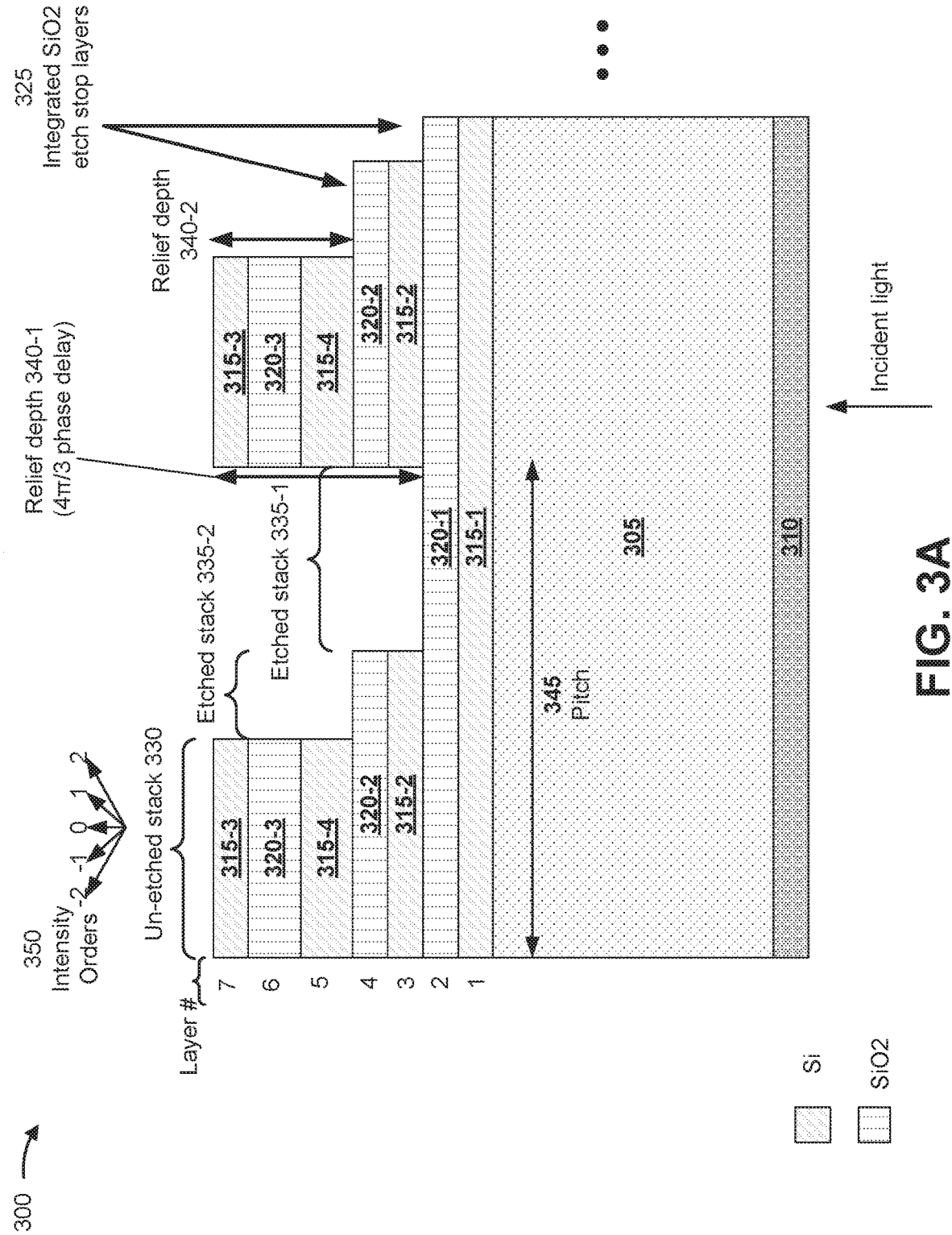
FIGS. 3A and 3B are diagrams of an example implementation described herein.
Figure 3B:
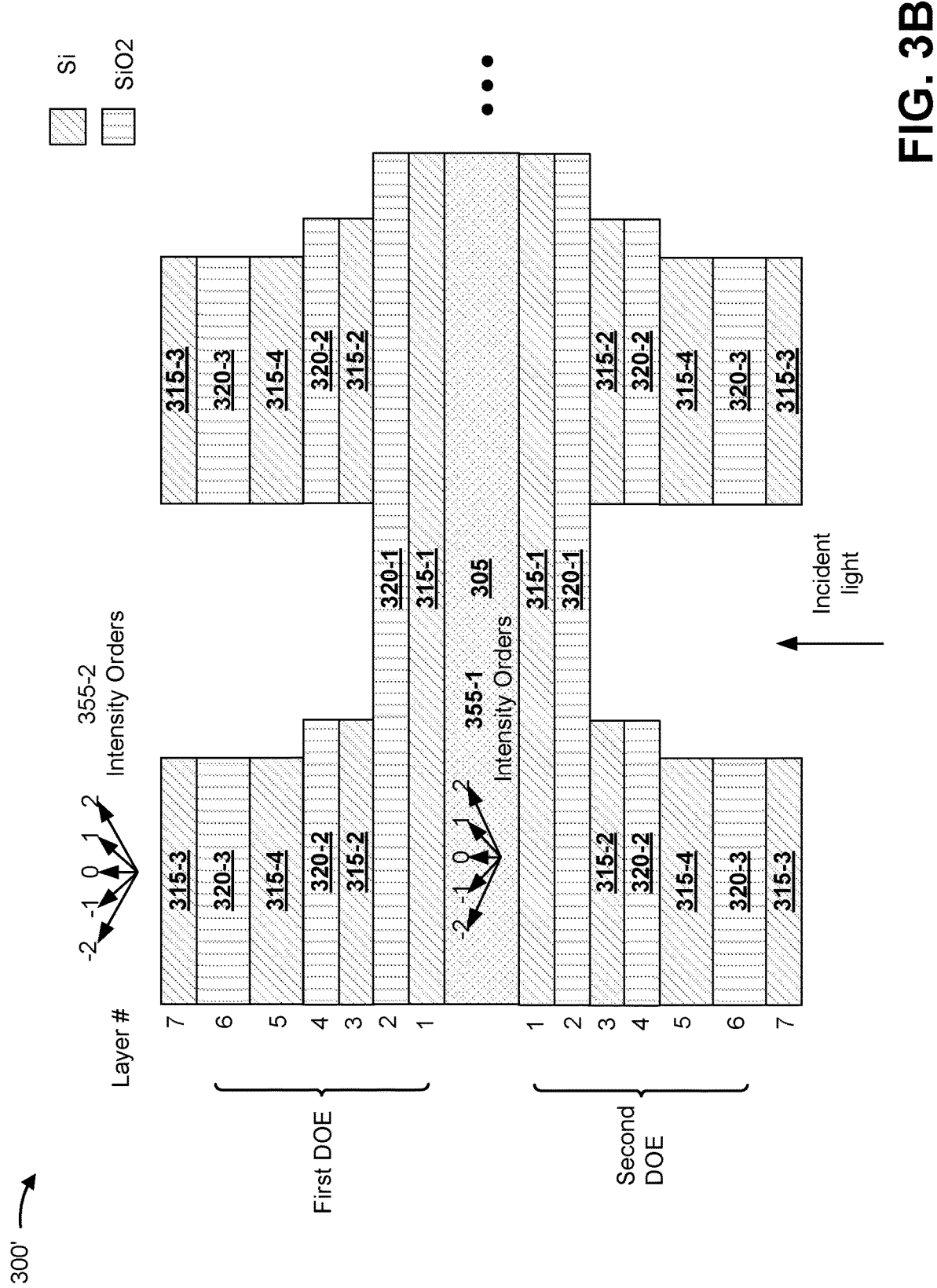

FIGS. 3A and 3B are diagrams of example implementations of DOEs 300 and 300'. As shown in FIG. 3A, DOE 300 includes a substrate 305, an anti-reflectance coating 310, a set of silicon layers 315-1 through 315-4, and a set of silicon dioxide layers 320-1 through 320-3.

As further shown in FIG. 3A, and by reference number 325, silicon dioxide layers 320-1 and 320-2 may be etch stop layers to enable etching to more accurately form a $2\pi(K-1)/K$ phase delay for a quantity of levels K. For example, an etching procedure may be performed such that un-etched stack 330 remains un-etched and etched stacks 335-1 and 335-2 are etched to relief depths 340-1 and 340-2, respectively. Relief depth 340-1 may provide a $2\pi(K-1)/K$ phase delay between etched stack 335-1 and un-etched stack 330. Relief depth 340-2 may provide a phase delay between 0 and $2\pi/K$ between etched stack 335-2 and un-etched stack 330. In some implementations, multiple etching procedures using multiple tools may be performed to etch DOE 300. For example, DOE 300 may be manufactured using multiple silicon dioxide etch tools, multiple silicon etch tools, multiple etching techniques (e.g., a deep reactive ion (DRIE) etch tool technique, a reactive-ion etching (RIE) tool technique, a sputter etching tool technique, and/or the like), and/or the like.

In some implementations, layers of DOE 300 may form a set of anti-reflectance structures. For example, layers 320-1 and 315-1 may form a first anti-reflectance structure for a particular wavelength range (e.g. the wavelength of incident light), layers 315-2 and 320-2 may form a second anti-reflectance structure for the particular wavelength range, and layers 315-3 and 320-3 may form a third anti-reflectance structure for the particular wavelength range, thereby forming a three-level relief profile having anti-reflectance structures built into each etched stack of the DOE 300 and built into the un-etched stack 330. Accordingly, the DOE 300 may not require additional anti-reflectance coatings or structures on the top surface.

In some implementations, described herein, the second anti-reflectance structure may be formed on the first anti-reflectance structure, and an adjacent surface of the first anti-reflectance structure (e.g., a top surface of layer 320-1) may be an etch stop for etching to form etched stack 335-1. Similarly, the third anti-reflectance structure may be formed on the second anti-reflectance structure, and an adjacent surface the second anti-reflectance structure (e.g., a top surface of layer 320-2) may be an etch stop when forming etched stack 335-2.

In some implementations, at least one layer, such as layer 315-4 and/or the like, may be between a set of anti-reflectance structures (e.g., between the first anti-reflectance structure and the second anti-reflectance structure, between the second anti-reflectance structure and the third anti-reflectance structure, and/or the like). In this way, an alteration to the relief depths 340-1 and/or 340-2 may be performed to alter a characteristic of DOE 300 without altering transmission characteristics of DOE 300. In some implementations, the first anti-reflectance structure, the second anti-reflectance structure, and/or the third anti-reflectance structure may not be separated by a layer.

In some implementations, each layer may be associated with a particular thickness. For example, the particular thickness may correspond to a wavelength of light for which the particular phase delay is caused and for which DOE 300 is transmissive (e.g., greater than a threshold percentage of transmissivity, such as greater than 99%, greater than 98%, greater than 97%, greater than 95%, greater than 90%, and/or the like). In some implementations, DOE 300 may be associated with a particular pitch 345 (sometimes termed a period), dx, which may correspond to a wavelength of light for which the particular phase delay is caused and for which DOE 300 is transmissive. In some implementations, a capping layer may be formed onto the seventh layer (e.g., another silicon dioxide layer), which may improve robustness during dicing of a wafer that includes DOE 300.

In some implementations, thicknesses of layers of DOE 300, a size of pitch 345, an index of refraction of the anti-reflectance structures and/or the layers thereof, and/or the like may be selected to cause a particular phase delay (e.g., the $2\pi(K-1)/K$ phase delay) at a particular wavelength for which the anti-reflectance structures provide an anti-reflectance functionality. For example, the first anti-reflectance structure may be associated with a first index of refraction of a particular amount, the second anti-reflectance structure may be associated with a second index of refraction of 3.4, the third anti-reflectance structure may be associated with a third index of refraction of 2.81 for a 940 nm three level thin film DOE. In some implementations, the particular wavelength may include a wavelength range of between approximately 1530 nm and 1570 nm, 930 nm to 950 nm, and/or the like. As shown by reference number 350, based on incident light being directed at a first side of substrate 305, a set of intensity orders (e.g., intensity orders −2, −1, 0, 1, 2, etc.) are provided by DOE 300. In some implementations, DOE 300 may provide greater than 50 intensity orders, greater than 100 intensity orders, greater than 200 intensity orders, greater than 300 intensity orders, greater than 350 intensity orders, greater than 500 intensity orders, and/or the like.

As shown in FIG. 3B, DOE 300' includes a first diffractive (transmissive) optical element formed on a first side of substrate 305 and a second diffractive (transmissive) optical element formed on a second side of substrate 305. Each diffractive optical element includes a set of silicon layers 315-1 through 315-4 and a set of silicon dioxide layers 320-1 through 320-3. As shown by reference numbers 355-1 and 355-2, based on incident light being directed toward DOE 300', the second diffractive optical element causes a first set of intensity orders to be directed through substrate 305 to the first diffractive optical element, which causes a second set of intensity orders to be provided from DOE 300'. In this way, substrate 305 maintains an alignment of the first diffractive optical element and the second diffractive optical element, thereby reducing a difficulty in maintaining alignment relative to another technique, such as free space optics or using a pick-and-place machine to independently align two separate DOEs. Moreover, based on disposing DOEs onto both sides of a substrate, an amount of mechanical stress may be balanced for the DOEs, thereby improving durability, increasing flatness of the DOEs across operating temperature ranges, reducing warping or bowing of the DOEs, and/or the like.

Although some implementations, described herein, are described in terms of a particular quantity of layers, such as 7 layers, other quantities of layers are possible, such as 8 layers (e.g., 8 alternating silicon/silicon dioxide layers), 9 layers, 10 layers, 20 layers, and/or the like.

As indicated above, FIGS. 3A and 3B are provided merely as examples. Other examples are possible and may differ from what was described with regard to FIGS. 3A and 3B.

Figure 4:
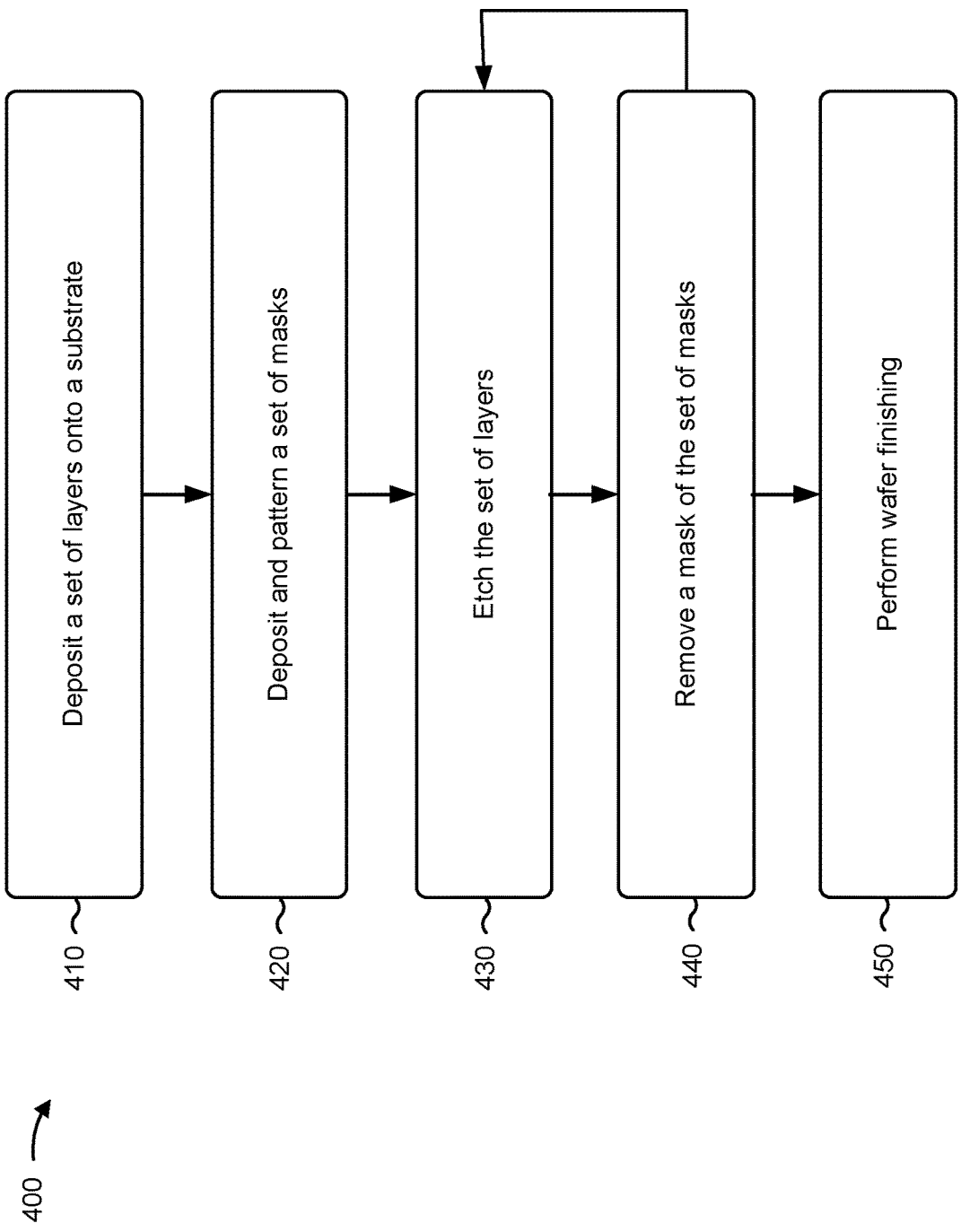
FIG. 4 is a flow chart of an example process for manufacturing an example implementation described herein.

FIG. 4 is a flow chart of an example process 400 for manufacturing a DOE. Examples of some manufacturing steps of process 400 are shown in more detail with regard to FIGS. 5A-5E and FIGS. 6A-6G.

As shown in FIG. 4, process 400 may include depositing a set of layers onto a substrate (block 410). For example, during manufacture, a deposition procedure may be used to deposit the set of layers onto the substrate. In some implementations, one or more of the set of layers may be a thin film deposited using a thin film deposition procedure, such as a sputter deposition procedure using a pulsed magnetron sputtering system. In some implementations, the set of layers may a set of silicon layers, a set of silicon dioxide layers, and/or the like. In some implementations, the set of layers may be deposited onto the substrate with a threshold tolerance. For example, the set of layers may be deposited within 2% of a specified thickness, within 1% of a specified thickness, within 0.5% of a specified thickness, within 0.25% of a specified thickness, within 0.1% of a specified thickness, within 0.01% of a specified thickness, and/or the like. In this way, layers for forming a first anti-reflectance structure for a particular wavelength, a second anti-reflectance structure for the particular wavelength, . . . , and an nth anti-reflectance structure for the particular wavelength may be deposited. In some implementations, the high accuracy in thickness when depositing thin film coatings may improve accuracy in the relief depth(s) of a DOE.

In some implementations, the substrate may be a glass substrate, a fused silica substrate, a substrate that is transparent for a particular wavelength of incident light, and/or the like. In some implementations, the set of layers may include multiple sets of silicon and silicon dioxide layers. For example, for a 4-level DOE, a first set of silicon and silicon dioxide layers may be deposited onto the substrate, a second set of silicon and silicon dioxide layers may be deposited onto the first set, a third set of silicon and silicon dioxide layers may be deposited onto the second set, and a fourth set of silicon and silicon dioxide layers may be deposited onto the third set. In this case, another silicon layer may be deposited onto the fourth set, and a set of three mask layers may be deposited onto the other silicon layer, as described in more detail herein, to enable etching and mask removal to form the 4-level DOE. In some implementations, other quantities of DOE levels may be possible, such as a 2-level DOE, a 3-level DOE, a 5-level DOE, a 6-level DOE, and/or the like.

In some implementations, an anti-reflectance coating layer may be formed using the set of layers. For example, the anti-reflectance coating may be a DOE anti-reflectance coating to stress balance the substrate and the DOEs, thereby reducing warping of the substrate over an operating temperature range. Additionally, or alternatively, an anti-reflectance layer may be deposited on a back side of the substrate (and layers to form a DOE may be deposited on a front side of the substrate). In some implementations, the set of layers may be deposited onto multiple sides of the substrate. For example, the set of layers may be deposited to form anti-reflectance structures on a first side of the substrate and on a second side of the substrate, which may result in the substrate supporting multiple DOEs. In some implementations, another set of materials may be used for at least one of the layers, such as a hydrogenated silicon based material, a tantalum pentoxide based material, a silicon nitride based material, and/or the like.

As further shown in FIG. 4, process 400 may include depositing a set of masks onto a surface of the set of layers (block 420). For example, during manufacture, a deposition procedure may be used to deposit the set of masks onto surfaces of the set of layers. In some implementations, multiple masks may be deposited. For example, to form a 4-level DOE, a first mask may be deposited onto a portion of a top layer of the set of layers, a second mask may be deposited onto a portion of the top layer and onto the first mask, a third mask may be deposited onto a portion of the top layer and onto the second mask. In this case, a patterning of the masks (e.g., a portion of the top layer that is covered by each of the masks, may be selected to enable forming of the 4-level DOE during etching and mask removal.

In some implementations, a material for the mask may be selected such that the mask is associated with a threshold selectivity or a threshold resistivity to silicon etching and/or silicon dioxide etching. In some implementations, the masks may be formed using multiple materials. For example, a first mask may be an aluminum mask and a second mask may be a photoresist mask. In this way, the masks may be configured such that removal of the first mask does not result in removal of the second mask, thereby enabling formation of a DOE. In this way, based on depositing multiple masks before etching, an accuracy of manufacture is improved, a manufacturability is improved, and an alignment tolerance is improved relative to other techniques, such as depositing mask layers onto etched layers of a DOE after one or more etching steps.

As further shown in FIG. 4, process 400 may include etching the set of layers (block 430), and removing a mask of the set of masks (block 440). For example, during manufacture, an etching procedure and a mask removal procedure may be performed to form a DOE. In this case, the etching procedure may include multiple etching steps and the mask removal procedure may include multiple mask removal steps. For example, for a 4-level DOE, a first etching step may be performed, a first mask removal step may be performed, a second etching step may be performed, a second mask removal step may be performed, a third etching step may be performed, and a third mask removal step may be performed, as described in more detail herein. In some implementations, multiple different types of mask removal steps may be performed for multiple different material masks. For example, an aluminum mask removal step may be performed to remove a first mask of aluminum and a photoresist mask removal step may be performed to remove a second mask of photoresist. In some implementations, the etch step may be performed to remove a subset of layers of the set of layers. For example, based on silicon dioxide layers being configured as etch stops, a single etch step may include a silicon dioxide etch to remove a first silicon dioxide layer followed by a silicon etch to remove a first silicon layer, such that a second silicon dioxide layer disposed below the first silicon layer etch stops the silicon etch to maintain the second silicon dioxide layer and/or a second silicon layer disposed below the second silicon dioxide layer. In this way, a set of anti-reflectance structures may be formed for the DOE.

As further shown in FIG. 4, process 400 may include performing wafer finishing (block 450). For example, the DOE may be tested, the DOE may be diced into multiple discrete DOEs (e.g., a wafer onto which multiple DOEs were patterned may be diced into the multiple discrete DOEs), and the DOE may be packaged for inclusion in an optical device. In some implementations, the wafer may be diced to form multiple 200 millimeter (mm)×0.725 mm wafers.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. As shown, FIGS. 5A-5E illustrate examples of etching a set of layers and removing a set of masks from the set of layers as described, above, with regard to blocks 430 and 440.

Figure 5A:
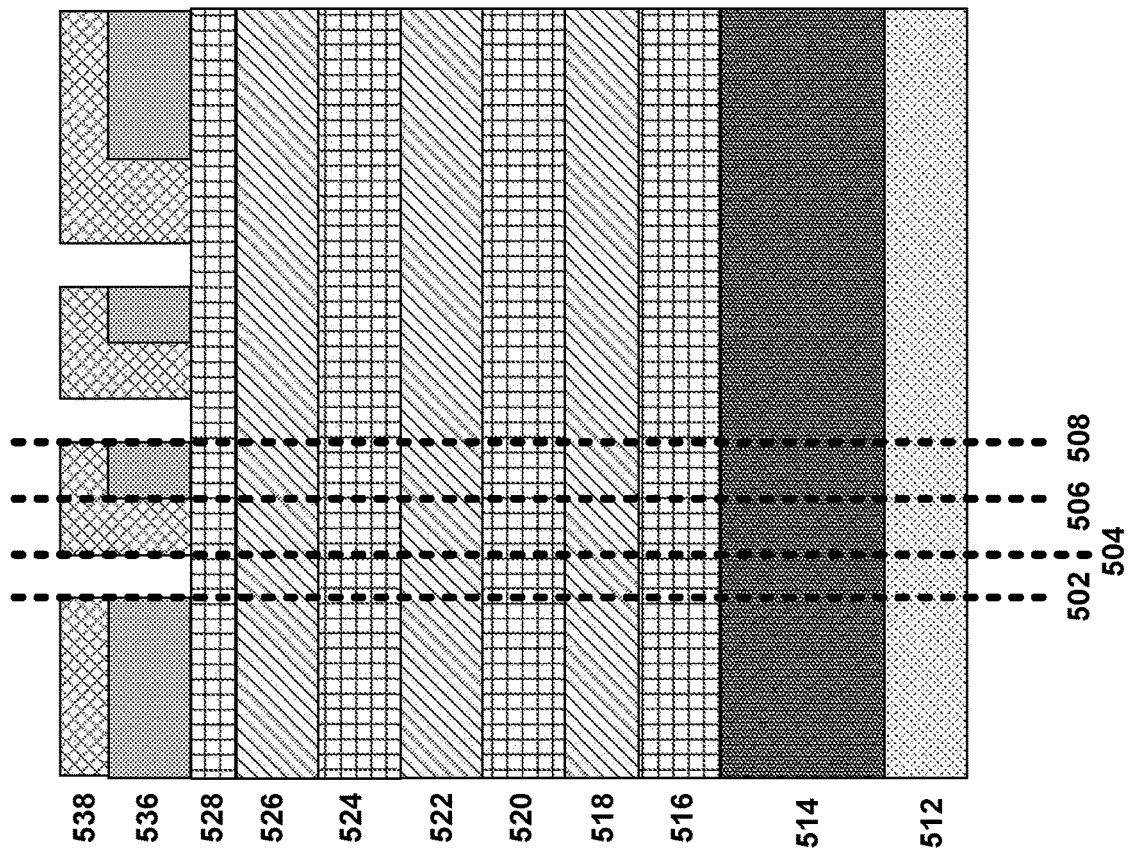
FIGS. 5A-5E are diagrams of an example implementation relating to the example process shown in FIG. 4.

As shown in FIG. 5A, and from reference line 502 to reference line 508, example implementation 500 may include a set of layers 512 to 528. The set of layers 512 to 528 may be planar and unetched. For example, example implementation 500 may include a substrate layer 514. A set of alternating silicon layers 516, 520, 524, and 528 and silicon dioxide layers 518, 522, and 526 are deposited on one surface of substrate layer 514. An optional anti-reflectance coating or structure 512 is provided on an opposite surface of the substrate layer 514.

As further shown with regard to FIG. 5A, mask layers 536 and 538 may be deposited and patterned onto portions of silicon layer 528, such that mask layers 536 and 538 cover portions of silicon layer 528. The materials used for each mask may be dissimilar so that the removal of mask 538 does not affect the pattern of mask 536. Mask layer 536 is deposited to cover silicon layer 528 between reference lines 506 and 508 to protect the set of layers 512-528 during etching thereby enabling etching to form a third anti-reflectance structure between reference lines 506 and 508. Mask layer 538 is deposited to cover silicon layer 528 between reference line 504 and reference line 506 to protect the set of layers 512 to 528 during etching thereby enabling etching to form a second anti-reflectance structure between reference lines 504 and 506. Mask layers 536 and 538 do not cover silicon layer 528 between reference lines 502 and 504 leaving the set of layers 512 to 528 unprotected during etching, thereby enabling etching to form a first anti-reflectance structure between reference lines 502 and 504, as described in more detail herein.

Figure 5B:
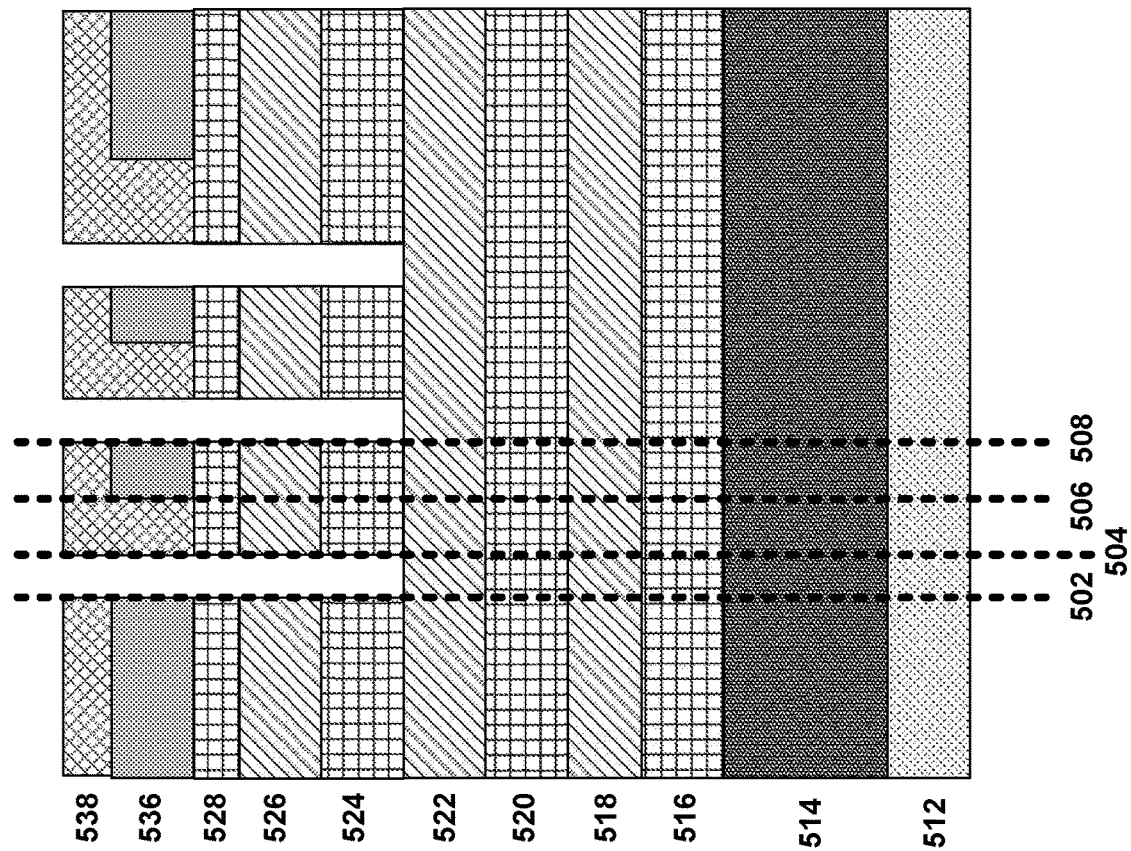

As shown in FIG. 5B, a first etching step of an etching procedure may be performed to remove a portion of silicon layer 528, silicon dioxide layer 526, and silicon layer 524 that is not covered by mask layer 538 (e.g., between reference lines 502 and 504). In this case, silicon dioxide layer 522 may perform an etch stop functionality for the first etching step.

Figure 5C:
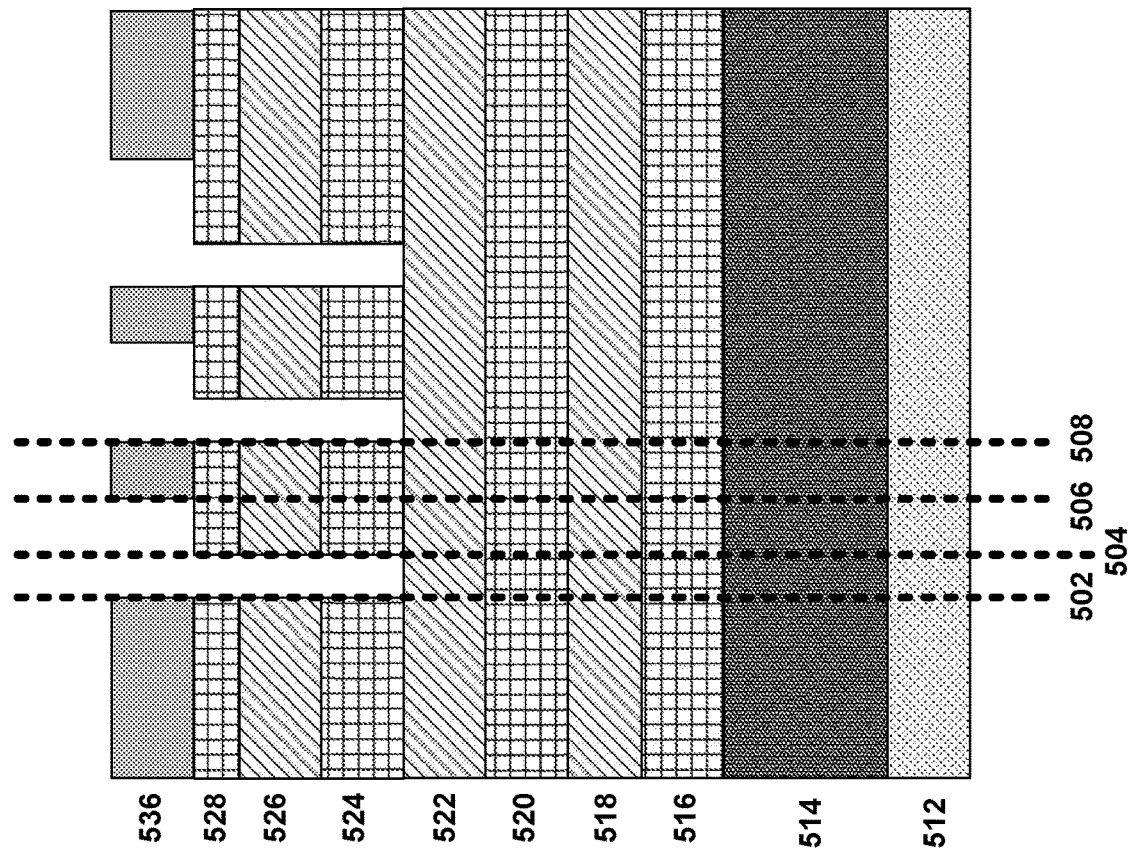

As shown in FIG. 5C, a first mask removal step of a mask removal procedure may be performed to remove mask layer 538, thereby exposing a portion of silicon layer 528 (e.g., between reference lines 504 and 506) and a portion of mask layer 536 (e.g., between reference lines 506 and 508).

Figure 5D:
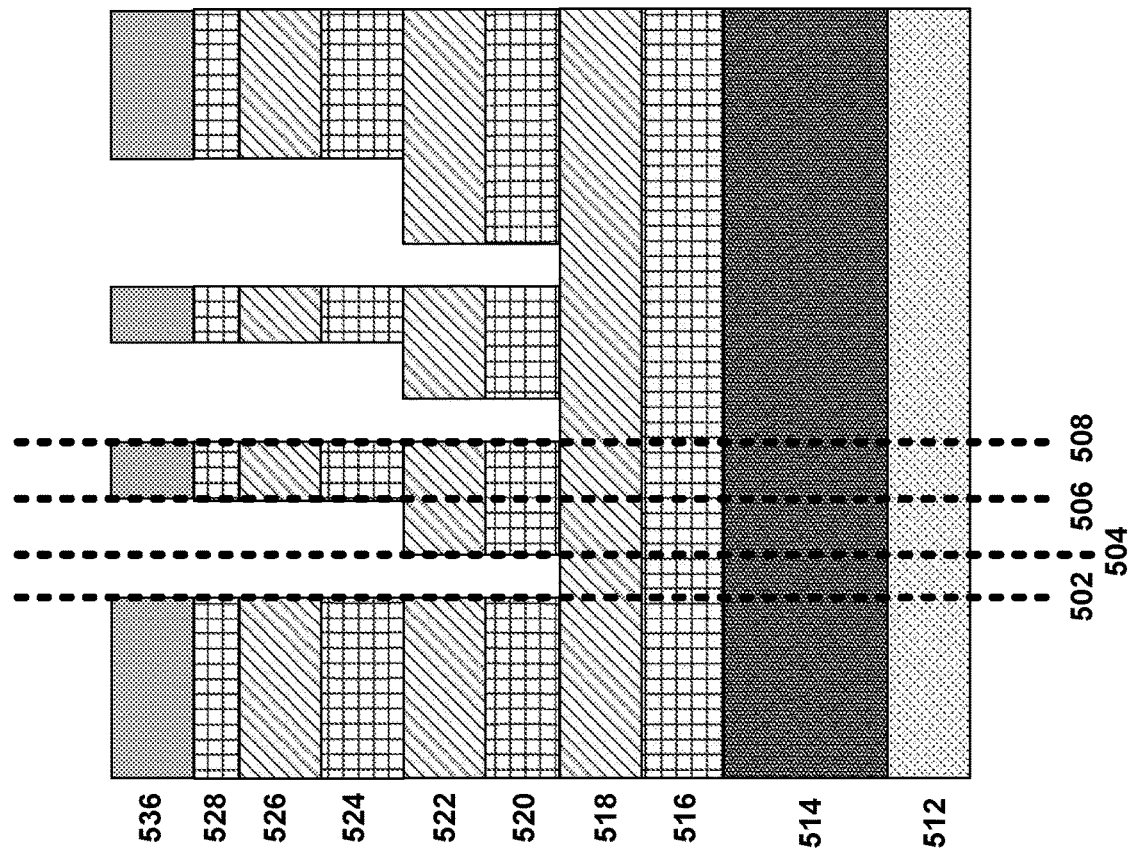

As shown in FIG. 5D, a second etching step of the etching procedure may be performed to remove silicon dioxide layer 522 and silicon layer 520 between reference lines 502 and 504, and to remove silicon layer 528, silicon dioxide layer 526, and silicon layer 524 between reference lines 504 and 506. In this case, silicon dioxide layer 518 may perform an etch stop functionality for the second etch step between reference lines 502 and 504, and silicon dioxide layer 522 may perform an etch stop functionality for the second etch step between reference lines 504 and 506.

Figure 5E:
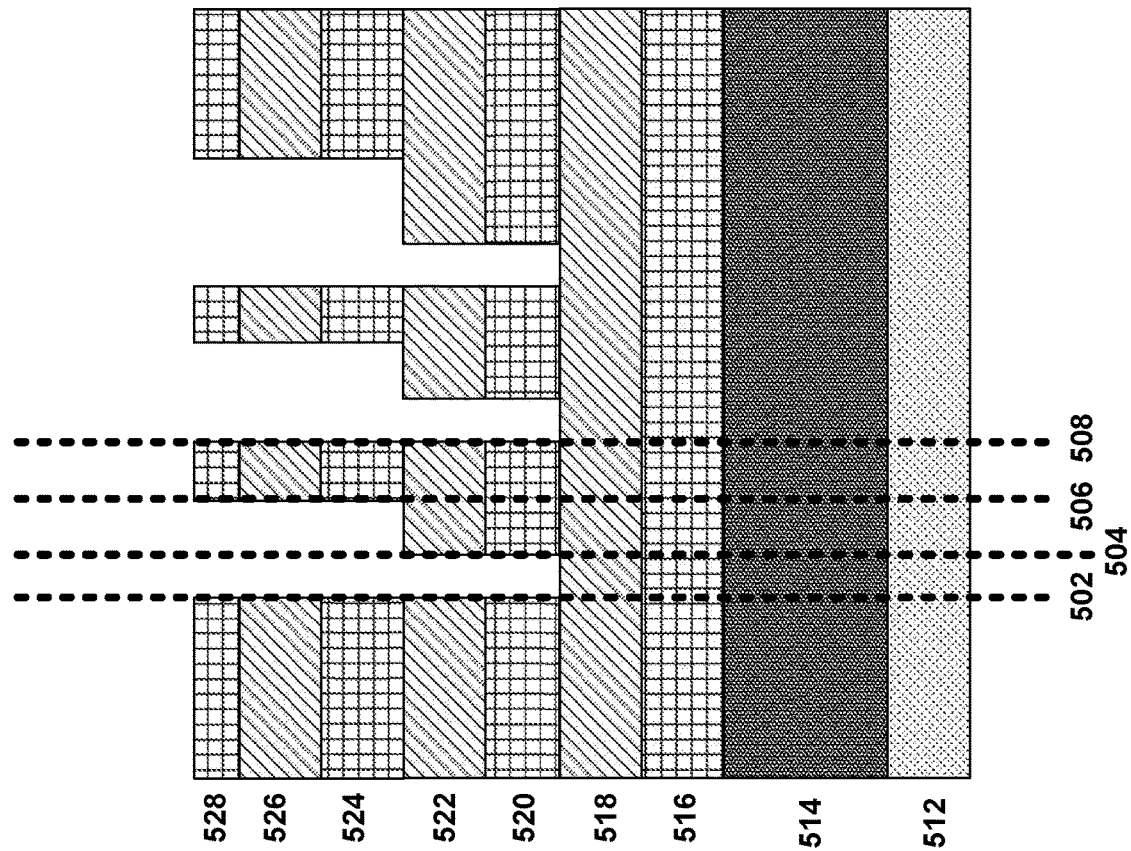

As shown in FIG. 5E, a second mask removal step of the mask removal procedure may be performed to remove mask layer 536, thereby exposing silicon layer 528 between reference lines 506 and 508. In this way, a 3-level relief profile may be formed with a first anti-reflectance structure for a particular wavelength between reference lines 502 and 504, a second anti-reflectance structure for the particular wavelength between reference lines 504 and 506, and a third anti-reflectance structure and another silicon layer (e.g., silicon layer 524) between reference lines 506 and 508. In this case, a phase delay between the first anti-reflectance structure between reference lines 502 and 504 and the third anti-reflectance structure between reference lines 506 and 508 may be a $\pi$ phase delay.

As indicated above, FIGS. 5A-5E are provided merely as an example. Other examples are possible and may differ from what was described with regard to FIGS. 5A-5E.

FIG. 6A-6G are diagrams of an example implementation 600 relating to example process 400 shown in FIG. 4. As shown, FIGS. 6A-6G illustrate examples of etching a set of layers and removing a set of masks from the set of layers as described, above, with regard to blocks 430 and 440.

Figure 6A:
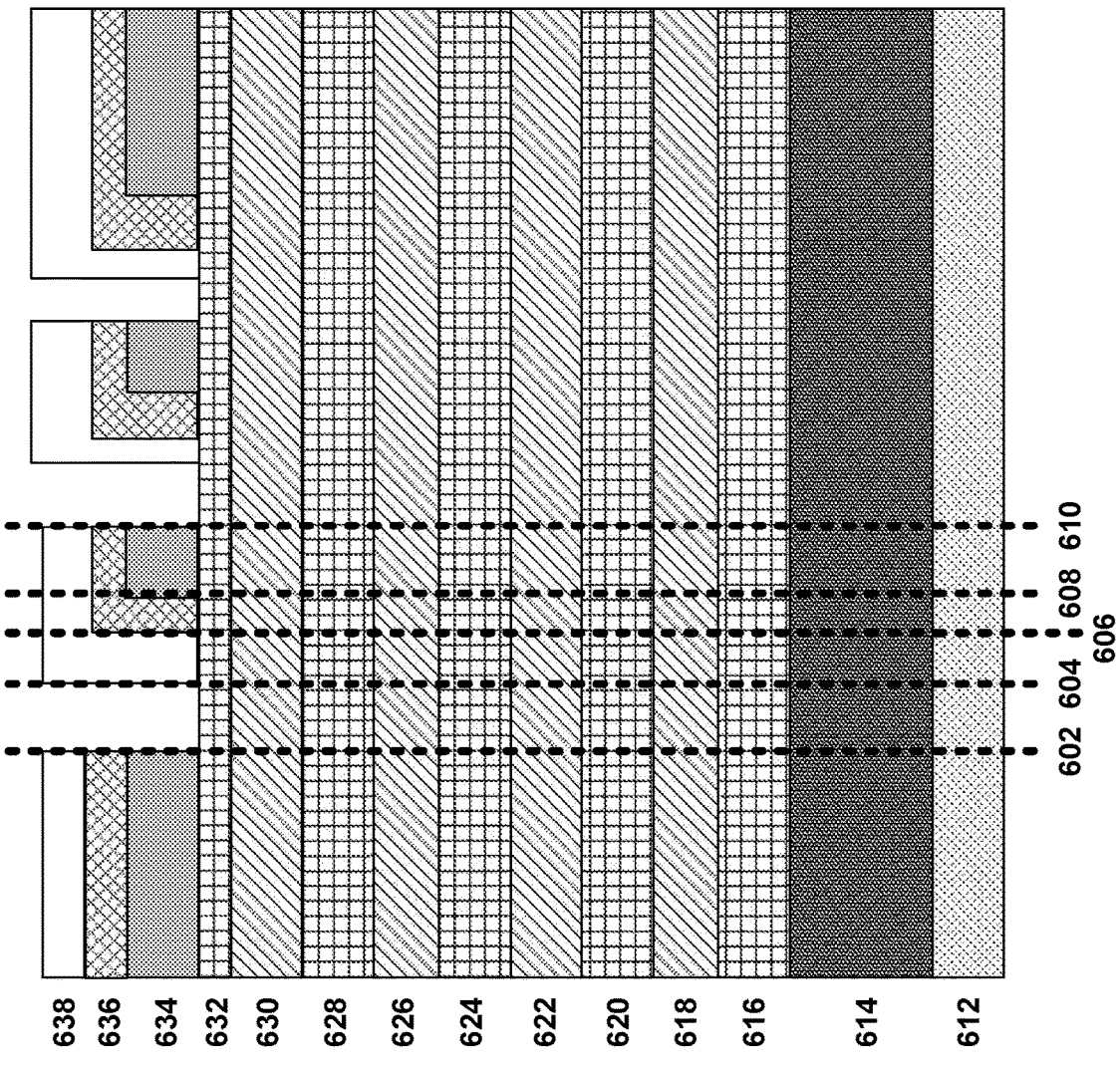

As shown in FIG. 6A, example implementation 600 from reference line 602 to reference line 610 may include a set of layers 612 to 632. The set of layers 612 to 632 may be planar and unetched. For example, example implementation 600 may include a substrate layer 614. An anti-reflectance layer 612 may be deposited onto a first side of substrate layer 614 and a set of alternating silicon layers 616, 620, 624, 628, and 632 and silicon dioxide layers 618, 622, 626, and 630 may be deposited onto a second side of substrate layer 614.

As further shown in FIG. 6A, mask layers 634, 636, and 638 are deposited and patterned to cover portions of silicon layer 632 to enabling an etching procedure and a mask removal procedure to be performed to form a set of four anti-reflectance structures between reference lines 602 and 610. The materials used for each mask 634, 636, 638 may be dissimilar so that the removal of one does not affect the pattern of the remaining mask(s).

Figure 6B:
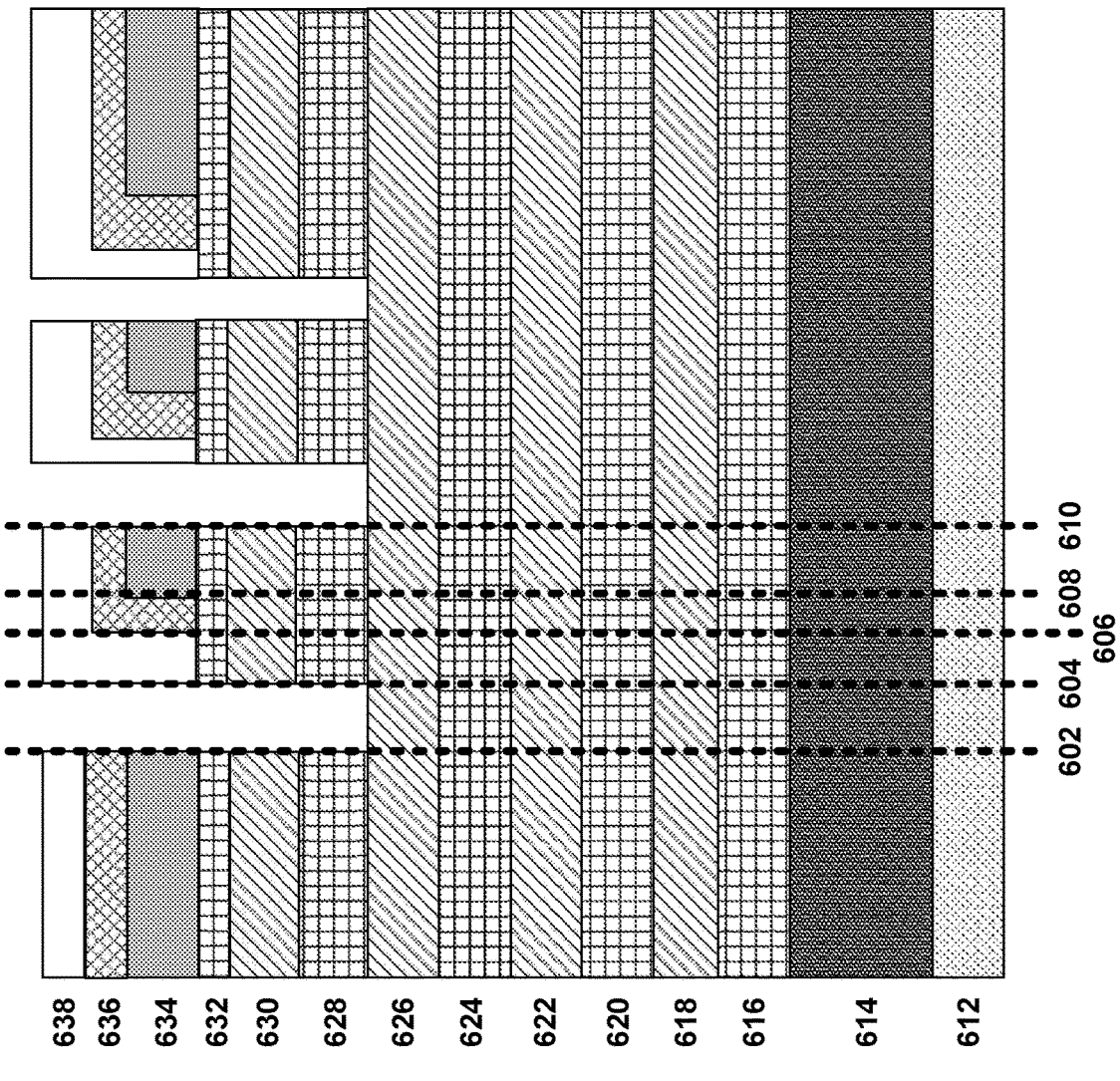

As shown in FIG. 6B, a first etch step of an etching procedure may be performed to remove a portion of silicon layer 632, silicon dioxide layer 630, and silicon layer 628 not covered by mask layer 638 (e.g., between reference lines 602 and 604). In this case, silicon dioxide layer 626 may perform an etch stop functionality for the first etching step.

Figure 6C:
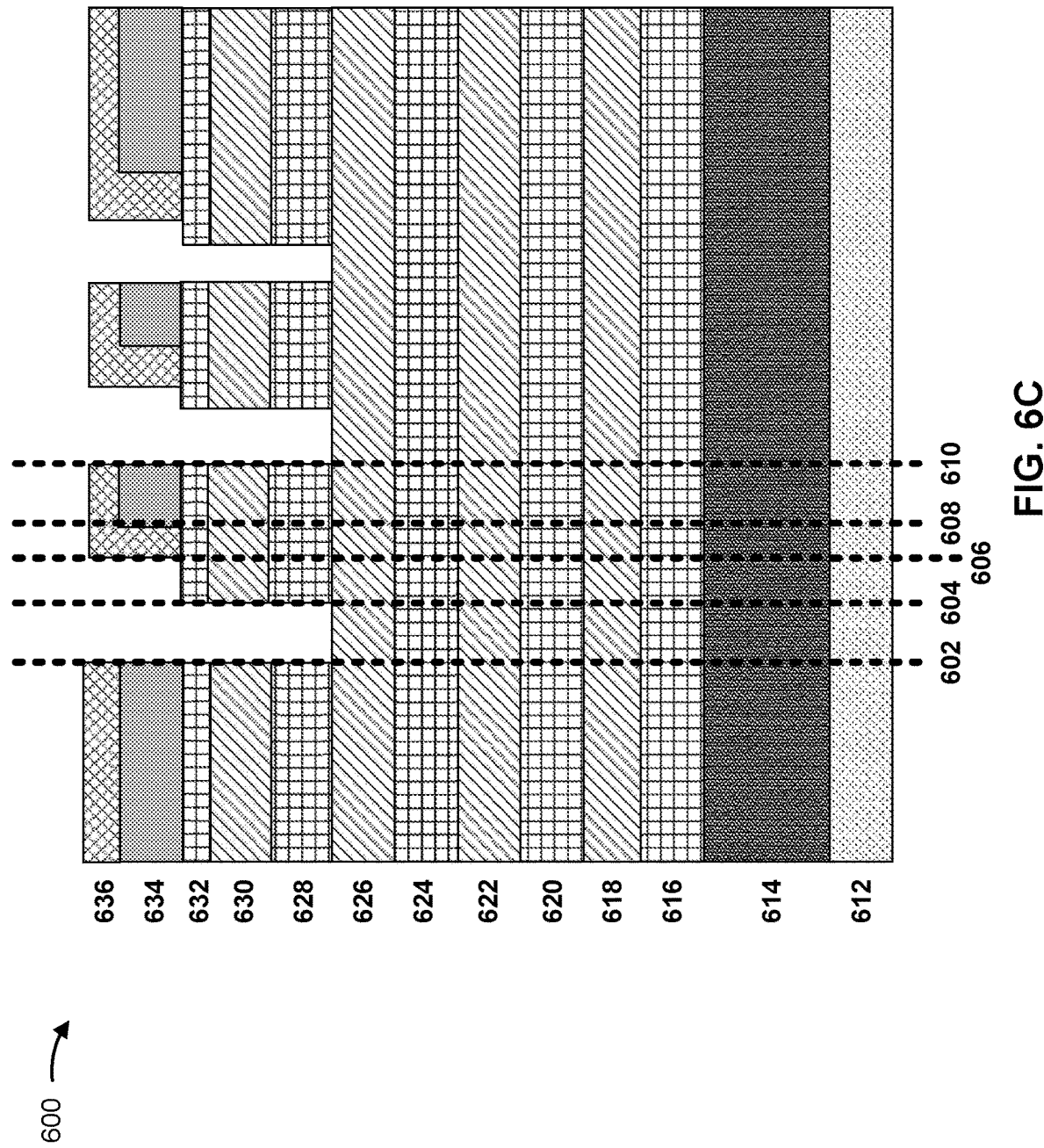

As shown in FIG. 6C, a first mask removal step of a mask removal procedure may performed to remove mask layer 638, thereby exposing a portion of silicon layer 632 between reference lines 604 and 606 and a portion of mask layer 636 between reference lines 606 and 610.

Figure 6D:
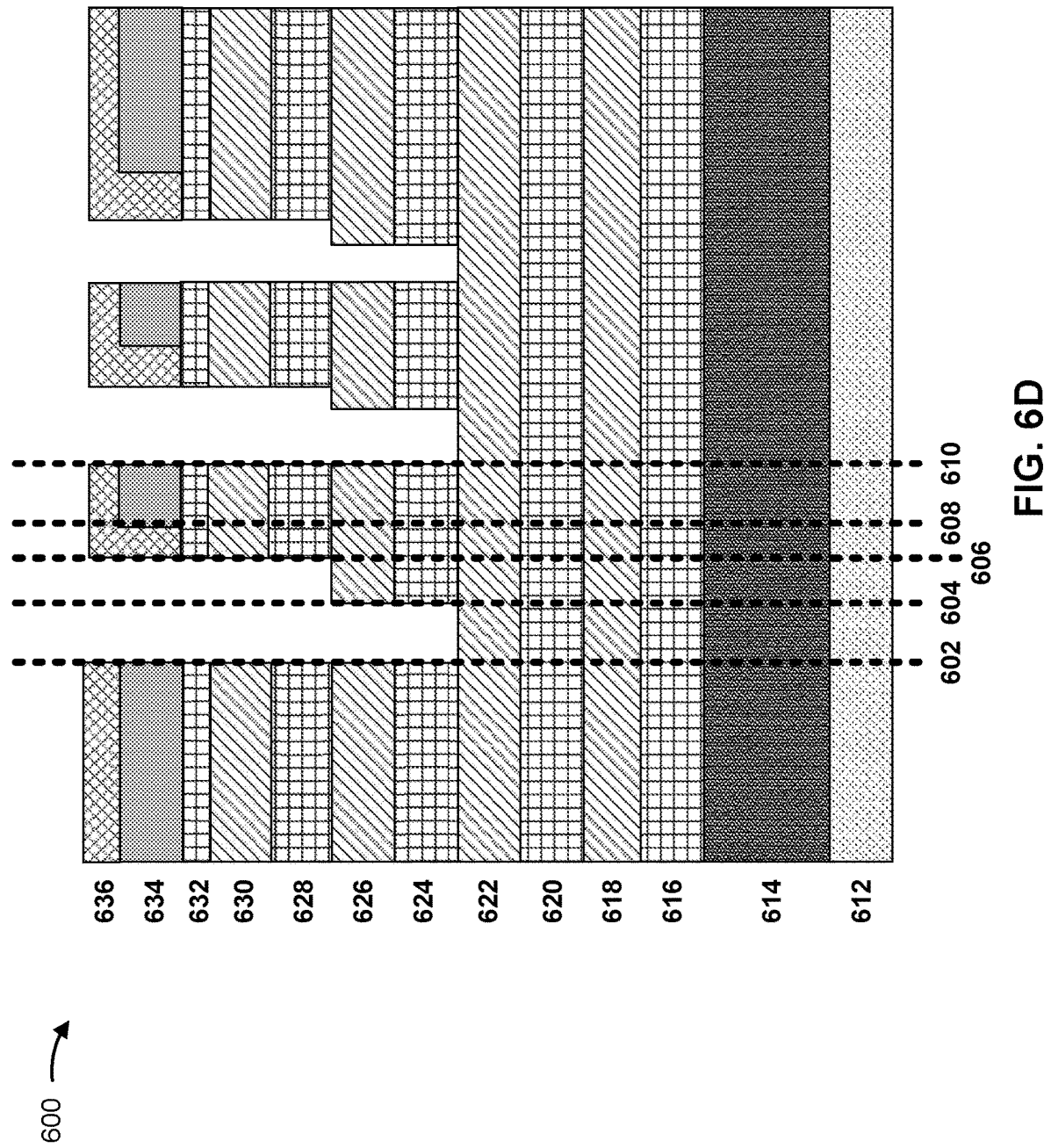

As shown in FIG. 6D, a second etch step of the etching procedure may be performed to remove silicon dioxide layer 626 and silicon layer 624 between reference lines 602 and 604, and to remove silicon layer 632, silicon dioxide layer 630, and silicon layer 628 between reference lines 604 and 606. In this case, silicon dioxide layer 622 may perform an etch stop functionality for the second etch step between reference lines 602 and 604, and silicon dioxide layer 626 may perform an etch stop functionality for the second etch step between reference lines 604 and 606.

Figure 6E:
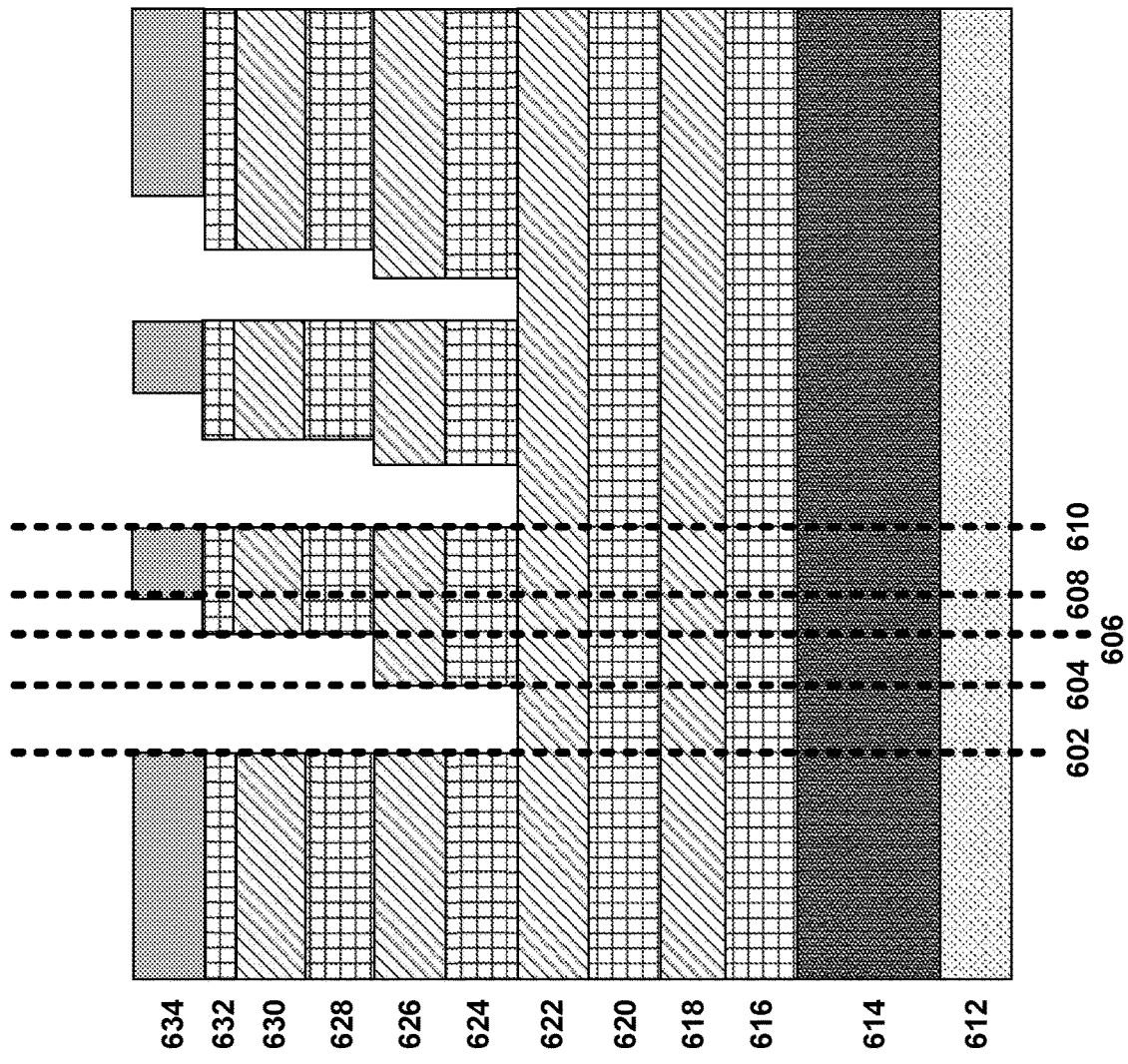

As shown in FIG. 6E, a second mask removal step of the mask removal procedure may be performed to remove mask layer 636, thereby exposing silicon layer 632 between reference lines 606 and 608 and a portion of mask layer 634 between reference lines 608 and 610.

As shown in FIG. 6F, a third etch step of the etching procedure may be performed to remove silicon dioxide layer 622 and silicon layer 620 between reference lines 602 and 604; silicon dioxide layer 626 and silicon layer 624 between reference lines 604 and 606; and silicon layer 632, silicon dioxide layer 630, and silicon layer 628 between reference lines 606 and 608. In this case, silicon dioxide layer 618 may perform an etch stop functionality for the third etch step between reference lines 602 and 604, silicon dioxide layer 622 may perform an etch stop functionality for the third etch step between reference lines 604 and 606, and silicon dioxide layer 626 may perform an etch stop functionality for the third etch step between reference lines 606 and 608.

Figure 6G:
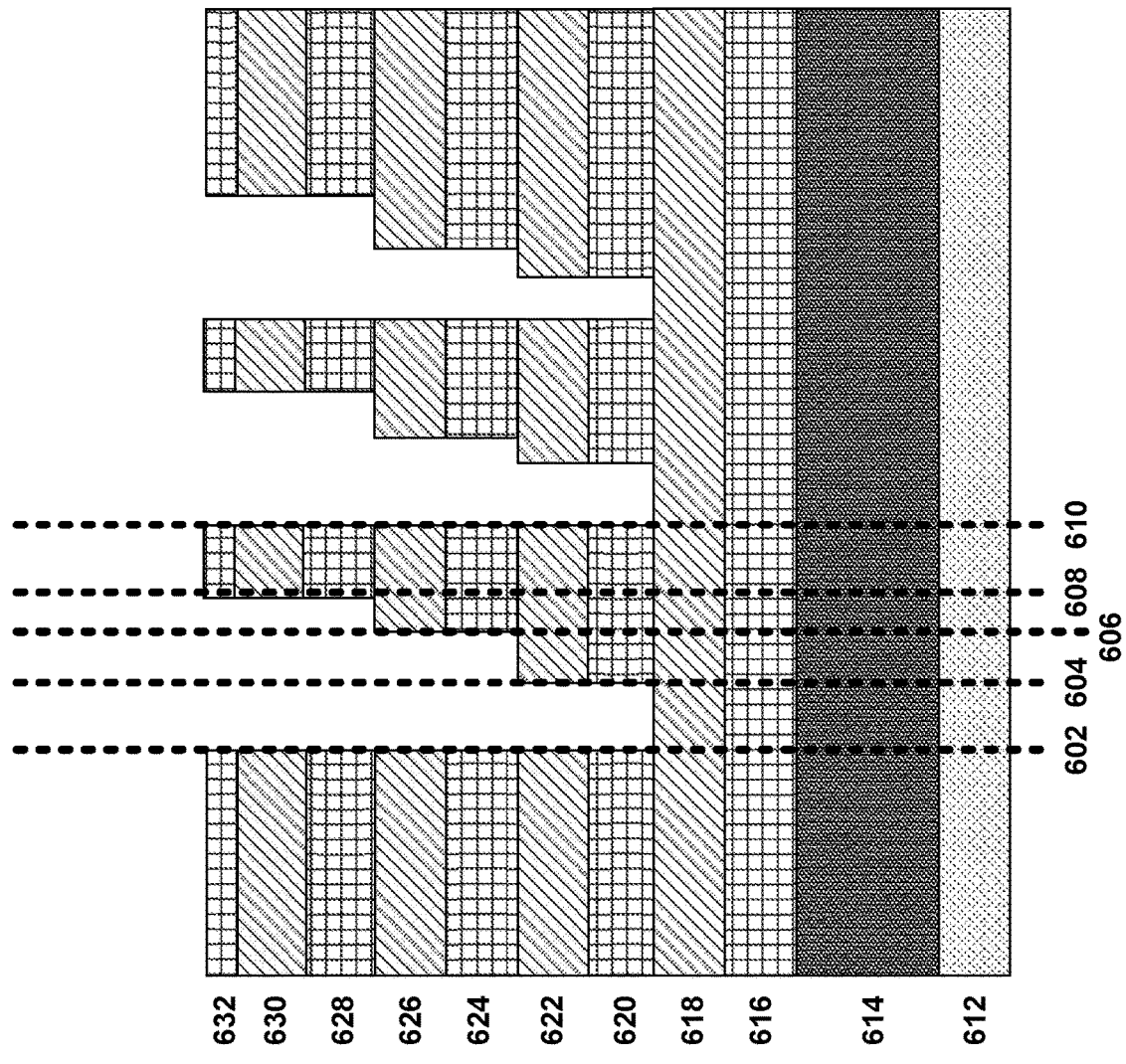

As shown in FIG. 6G, a third mask removal step of the mask removal procedure may be performed to remove mask layer 634, thereby exposing silicon layer 632 between reference lines 608 and 610.

In this way, a 4-level relief profile may be formed with a first anti-reflectance structure for a particular wavelength between reference lines 602 and 604, a second anti-reflectance structure for the particular wavelength between reference lines 604 and 606, a third anti-reflectance structure for the particular wavelength between reference lines 606 and 608, and a fourth anti-reflectance structure and another silicon layer (e.g., silicon layer 628) between reference lines 608 and 610. In this case, a phase delay between the first anti-reflectance structure between reference lines 602 and 604 and the fourth anti-reflectance structure between reference lines 608 and 610 may be a π phase delay.

As indicated above, FIGS. 6A-6G are provided merely as an example. Other examples are possible and may differ from what was described with regard to FIGS. 6A-6G.

In this way, a DOE with a thin film stack including alternating silicon layers (e.g., hydrogenated silicon layers) and silicon dioxide layers etched into a multi-level (e.g., three or more level) relief profile is configured and manufactured. Moreover, layers of the DOE may be designed to provide anti-reflectance properties, integrated etch stop properties, and/or the like. Furthermore, design may be performed using thin film process deposition, which may control zero order power. Furthermore, based on using thin film deposition and etching, a quantity of manufacture steps to manufacture the DOE may be reduced, thereby reducing time and cost relative to other techniques for manufacturing a DOE.

In the example embodiments illustrated in, for example, FIGS. 5A-5E, 6A-6G, and/or the like, the relief depths and anti-reflection structures have been illustrated as a periodic or repeating pattern and with a constant cross-section, such as found in a diffraction grating. Other, non-periodic relief depths and anti-reflection structures with irregular or variable cross-sections are equally contemplated, such as, but not limited to, DOEs for pattern generation, depth mapping dot projection, and structured light.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    depositing a plurality of layers onto a substrate;
    depositing a first mask and a second mask on a top layer of the plurality of layers,
        the first mask having a different pattern than the second mask, and
        the first mask completely covering a top surface of the second mask;
    etching a first subset of layers, of the plurality of layers, at a first location that is not covered by the first mask or the second mask;
    removing the first mask, without removing the second mask, to expose a second location of the first subset of layers and to expose the top surface of the second mask; and
    etching the second location of the first subset of layers and the first location of a second subset of layers, of the plurality of layers, that are not covered by the second mask to form a three or more-level relief profile within the plurality of layers,
        the three or more-level relief profile including:
            a first anti-reflectance structure at the first subset of layers;
            a second anti-reflectance structure at the second subset of layers; and
            a third anti-reflectance structure.

2. The method of claim 1, further comprising:
    removing the second mask after etching the second location of the first subset of layers and the first location of the second subset of layers.

3. The method of claim 1, wherein the plurality of layers include alternating first layers of a first refractive index and second layers of a second refractive index.

4. The method of claim 3, wherein the first layers are silicon layers and the second layers are silicon dioxide layers.

5. The method of claim 4, wherein the first mask and the second mask are deposited onto a silicon layer of the silicon layers.

6. The method of claim 1, wherein the first mask uses a different material than the second mask.

7. The method of claim 1, wherein the first mask is deposited directly on the second mask and a layer of the plurality of layers.

8. The method of claim 1, wherein etching the first subset of layers includes:
removing a portion of a first layer of a first refractive index;
removing a portion of a second layer of a second refractive index; and
removing a portion of a third layer of the first refractive index,
the first subset of layers including the first layer, the second layer, and the third layer, and
the first refractive index being different than the second refractive index.

9. The method of claim 8, wherein the second layer is between the first layer and the third layer.

10. The method of claim 8, wherein etching the first subset of layers includes:
exposing a fourth layer of the second refractive index,
the fourth layer being between the third layer and the substrate.

11. The method of claim 1, wherein the second location is directly adjacent to the first location.

12. The method of claim 1, wherein the first location of the second subset of layers is under the first location of the first subset of layers.

13. The method of claim 1, wherein etching the second location of the first subset of layers and the first location of the second subset of layers includes:
removing a portion of a first layer of a first refractive index;
removing a portion of a second layer of a second refractive index;
removing a portion of a third layer of the first refractive index,
the first subset of layers including the first layer, the second layer, and the third layer;
removing a portion of a fourth layer of the second refractive index; and
removing a portion of a fifth layer of the first refractive index,
the second subset of layers including the fourth layer and the fifth layer.

14. The method of claim 13, wherein the second layer is between the first and third layer, and
wherein the fourth layer is between the fifth layer and the third layer.

15. The method of claim 13, wherein etching the second location of the first subset of layers and the first location of the second subset of layers includes:
exposing a sixth layer of the second refractive index,
the sixth layer being between the fifth layer and the substrate.

16. The method of claim 1, further comprising:
depositing a third mask on the top layer of the plurality of layers,
the third mask having a different pattern than the first mask and the second mask.

17. The method of claim 16, further comprising:
removing the second mask, without removing the third mask, to expose a third location of the first subset of layers; and
etching the third location of the first subset of layers, the second location of the second subset of layers, and the first location of a third subset of layers, of the plurality of layers, that are not covered by the third mask,
the three or more-level relief profile being a four-level relief profile.

18. The method of claim 17, further comprising:
removing the third mask after etching the third location of the first subset of layers, the second location of the second subset of layers, and the first location of the third subset of layers.

19. The method of claim 1, wherein a first relief depth between a first surface of the first anti-reflectance structure and a second surface of the second anti-reflectance structure and a second relief depth between the first surface and a third surface of the third anti-reflectance structure are configured to form a diffractive optical element associated with a first phase delay and a second phase delay, respectively, for a particular wavelength range.

20. The method of claim 1, further comprising:
forming an anti-reflectance coating, using the plurality of layers, to stress balance the substrate and the three or more-level relief profile.

* * * * *